US011875641B2

(12) United States Patent
Wingate et al.

(10) Patent No.: US 11,875,641 B2
(45) Date of Patent: *Jan. 16, 2024

(54) SYSTEMS AND METHODS FOR INFERRING TRANSACTION BASED ON DATA DETECTED FROM RFID ELEMENTS AT A SMART GAME TABLE

(71) Applicant: Walker Digital Table Systems, LLC, Las Vegas, NV (US)

(72) Inventors: Todd Alan Wingate, Las Vegas, NV (US); Stephen Moore, Las Vegas, NV (US); Carolyn Moore, Las Vegas, NV (US)

(73) Assignee: Walker Digital Table Systems, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,750

(22) Filed: Jan. 27, 2022

(65) Prior Publication Data

US 2022/0148380 A1 May 12, 2022

Related U.S. Application Data

(63) Continuation of application No. 17/146,421, filed on Jan. 11, 2021, now Pat. No. 11,238,699, which is a (Continued)

(51) Int. Cl.
*G07F 17/32* (2006.01)

(52) U.S. Cl.
CPC ........ *G07F 17/3244* (2013.01); *G07F 17/322* (2013.01)

(58) Field of Classification Search
USPC ........................................................... 463/25
See application file for complete search history.

(56) References Cited

U.S. PATENT DOCUMENTS 7,719,424 B2 5/2010 Steil
7,822,641 B2 10/2010 Abbott et al.
(Continued)

FOREIGN PATENT DOCUMENTS

WO WO2017/143313 8/2017
WO WO2017/193102 11/2017

OTHER PUBLICATIONS

PR Newswire-2 “GPI to Supply Table Game Products for Newest California Tribal Casino” https://dialog.proquest.com/professional/docview/447303605/1835949C60E560C4594/4?accountid-157 282; Jan. 20, 2009.

(Continued)

*Primary Examiner* — Pierre E Elisca
(74) *Attorney, Agent, or Firm* — RowanTree Law Group, PLLC; Magdalena M. Fincham

(57) ABSTRACT

In accordance with some embodiments, a game table such as a smart baccarat table may be equipped with one or more detecting components (e.g., an RFID antenna, an NFC antenna or an optical reader) to identify gaming elements placed in a certain area of the smart table that a dealer of the table places gaming elements into when conducting a transaction. A specific type of transaction may be automatically inferred by the game table, without a dealer specifically requesting an initiation of a mode or process for the type of transaction, based on statuses of the gaming elements detected within the area. For example, a Change Transaction may be inferred upon the game table determining that both inventory and non-inventory game elements are present within the area of the table at the same time.

17 Claims, 8 Drawing Sheets

Related U.S. Application Data continuation of application No. PCT/US2019/040199, filed on Jul. 1, 2019.

(60) Provisional application No. 62/698,047, filed on Jul. 14, 2018.

(56) References Cited

U.S. PATENT DOCUMENTS

| | | | | |
|---|---|---|---|---|
| 7,938,722 | B2 | 5/2011 | Rowe et al. | |
| 7,982,617 | B2 | 7/2011 | Koyama et al. | |
| 8,016,665 | B2 | 9/2011 | Gururajan et al. | |
| 8,092,293 | B2 | 1/2012 | Richards et al. | |
| 8,277,310 | B2 | 10/2012 | Koyama | |
| 8,337,296 | B2 * | 12/2012 | Grauzer | G07F 17/322 463/22 |
| 8,449,370 | B2 | 5/2013 | Koyama et al. | |
| 8,480,484 | B2 | 7/2013 | Steil | |
| 8,540,579 | B2 | 9/2013 | Richard et al. | |
| 8,608,548 | B2 | 12/2013 | Mattice et al. | |
| 8,932,124 | B2 * | 1/2015 | Lutnick | G07F 17/3225 463/19 |
| 9,378,605 | B2 | 6/2016 | Koyama | |
| 9,514,597 | B2 | 12/2016 | Schwartz | |
| 9,520,025 | B2 | 12/2016 | Koyama et al. | |
| 10,706,681 | B2 | 7/2020 | Kotab | |
| 11,107,315 | B2 * | 8/2021 | Moore | A63F 1/06 |
| 2007/0057469 | A1 | 3/2007 | Grauzer et al. | |
| 2007/0238502 | A1 * | 10/2007 | Pokorny | G07F 17/32 463/12 |
| 2008/0074271 | A1 | 3/2008 | Hodges | |
| 2009/0054130 | A1 | 2/2009 | Gelinotte et al. | |
| 2016/0019751 | A1 * | 1/2016 | Arnone | G07F 17/3237 463/25 |
| 2018/0075690 | A1 * | 3/2018 | Moore | G07F 17/3288 |
| 2018/0276951 | A1 * | 9/2018 | Litman | G07F 17/3293 |
| 2019/0073855 | A1 * | 3/2019 | Moore | G06K 7/10 |
| 2019/0073868 | A1 * | 3/2019 | Arnone | G07F 17/32 |
| 2019/0295368 | A1 * | 9/2019 | Arnone | G07F 17/3204 |
| 2019/0304248 | A1 * | 10/2019 | Bryant | G07F 17/3241 |

OTHER PUBLICATIONS

Jeff Hecht "Casino Chips to Carry RFID tags" https://www.newscientist.com/article/dn4542-casino-chips-to-carry-rfid-tags/; Jan. 9, 2004.

Wyld "The Ace in the Hole" https://dialog. proquest.com/professional/docview/214846677 /18357F5E5C12DB3FA 1 F/1 ?accountid=1 57282; 2007.

John wehr "Gaming Company Takes RFID to the Casino" https://www.secureidnews.com/news-item/gaming-company-takes-rfid-to-the-casino/#; Dec. 26, 2004.

Alorie Gilbert "Vegas Casino Bets on RFID" https://www.cnet.com/news/privacy/vegas-casino-bets-on-rfid/; Feb. 9, 2005.

Floerkemeier et al. "Smart Playing Cards—Enhancing the Gaming Experience with RFID" https://www .semanticscholar.org/paper/Smart-Playing-Cards-Enhancing-the-Gaming-Experience-Floerkemeier-Mattern/0a5864143c3a2ecfa4ee90d76638cfef91 fdfaa9; 2006.

David C. Wyld "Radio Frequency Indentification: Advanced Intelligence for Table Games in Casinos" https://journals.sagepub.com/doi/10.1177/193896550836147; 2008 unselected.

PR Newswire: https://dialog. proquest.com/professional/docview/448560799/1835919BF193F435DCF/6?accountid=15 7282; Sep. 4, 2008 unselected.

Tampabay "Wired Chips Track High Rollers" https://www.tampabay.com/archive/2005/06/20/wired-chips-track-high-rollers/; Jun. 20, 2005.

Jose Fermoso "Aces Wild: IT Exec Builds RFID-enabled Poker Table" https://www .wired.com/2008/12/aces-wild-it-ex/; Dec. 19, 2008.

Written Opinion for PCT/US2019/040199 dated Sep. 20, 2019. 8 pps.

International Search Report for PCT/US2019/040199 dated Sep. 20, 2019. 2 pps.

International Preliminary Report on Patentability PCT/US2019/040199 dated Jan. 28, 2021. 6 pps.

Notice of Allowance for U.S. Appl. No. 17/146,421 dated Sep. 28, 2021; 8 pps.

Substantive Examination Report for Philippines Application No. 1-2021-550026 dated May 4, 2023; 7 pps.

* cited by examiner

SYSTEMS AND METHODS FOR INFERRING TRANSACTION BASED ON DATA DETECTED FROM RFID ELEMENTS AT A SMART GAME TABLE

CLAIM OF PRIORITY

The present application is a Continuation Application of U.S. application Ser. No. 17/146,421, filed on Jan. 11, 2021 in the name of Moore et al. Wingate et al. and titled SYSTEMS AND METHODS FOR INFERRING TRANSACTION BASED ON DATA DETECTED FROM RFID ELEMENTS AT SMART GAME TABLE, which Application is a Continuation Application of PCT Application No. PCT/US2019/040199, filed on Jul. 1, 2019 in the name of Moore et al. and titled SYSTEMS AND METHODS FOR INFERRING TRANSACTION BASED ON DATA DETECTED FROM RFID ELEMENTS AT SMART GAME TABLE, which PCT Application claims priority to U.S. Provisional Application No. 62/698,047, filed on Jul. 14, 2018 in the name of Moore et al. and titled SYSTEMS AND METHODS FOR FACILITATING A CHANGE TRANSACTION AT AN RFID-ENABLED GAME TABLE. The entirety of each of these Applications is incorporated by reference herein for all purposes.

SUMMARY OF SOME EMBODIMENTS

Some of the embodiments provided herein are directed to an electronic gaming table system (e.g., a smart table operable to facilitate a card game, such as baccarat, blackjack or poker) which includes (i) at least one detecting mechanism for detecting a plurality of game elements (e.g., wagering chips) placed on, or removed from, a particular physical position of a physical table of the gaming table system, such as an RFID antenna at a dealer position or area; and (ii) a game controller operable to identify a type of transaction being conducted at the gaming table system, based at least on data received from the at least one detecting mechanism. For example, a game controller of the electronic gaming table may be operable to infer that a Change Transaction is being conducted or requested by a player upon determining that both inventory and non-inventory chips (described in more detail herein) are present on a dealer antenna or otherwise within range of a detecting component of the electronic gaming table. The game controller may further be operable to (i) store, for each authorized wagering chip detectable by the detecting mechanism, a unique identifier of that chip and information corresponding to that chip, such as a status indicator; and (ii) look up or retrieve the status of each chip detected by the detecting mechanism upon receiving the unique identifier of the chip from the detecting mechanism.

In accordance with some embodiments, the game controller may further be operable to perform one or more actions or trigger one or more events based on logic or programming that utilizes the status indicator information of a wagering chip. In accordance with some embodiments, the game controller may facilitate, process or initiate one or more particular sub-subroutines, modes or software modules based on a determination of a status (or a determination of different statuses for different wagering chips) detected by the detecting mechanism of a particular physical position of the physical table. In some embodiments, the system may infer whether a particular type of transaction is being conducted based on the respective statuses of the chips detected on the dealer antenna or other particular area of the table in conjunction with other factors, such as a stage of a game or state of the table and/or whether another type of transaction is already in progress. For example, in accordance with one embodiment, the game controller may initiate or enter into a particular transaction mode or subroutine upon determining that one or more certain conditions have been satisfied and/or a predetermined event detected. In one specific example, a "Change Transaction" mode or subroutine may be initiated upon determining that wagering chips of different particular statuses (or wagering chips corresponding to two different types of statuses, as stored in a memory in which unique identifiers of such wagering chips are associated with one or more statuses and other information) have been detected by a dealer antenna at a dealer area or position of the table. For example, the system may infer that a Change Transaction is being conducted, and thus launch a Change Transaction sub-routine or enter a Change Transaction mode, upon determining that both inventory chips and non-inventory chips are present on a dealer antenna or other particular area of a gaming table.

A "Change Transaction" as used herein refers to a transaction in which a first at least one wagering chip of a first value and comprising a first denomination(s) distribution is exchanged for a second at least one wagering chip of the same value but comprising a second and different denomination distribution, such as when a player is exchanging a large denomination chip having a first monetary value for a plurality of smaller denomination chips that sum to the same first monetary value. A "color up" transaction is a particular type of Change Transaction in which a player exchanges a first set of relatively smaller denomination chips for a second set of larger denomination chips (the second set may comprise a single larger denomination chip), both sets of chips having the same total monetary value.

In one embodiment, a status associated with a wagering chip may be set to either "inventory" or "non-inventory." A wagering chip corresponding to a status of "inventory" is referred to as an "inventory chip" herein while a wagering chip corresponding to a status of "non-inventory" is referred to as a "non-inventory chip" herein. A status indicator of "non-inventory" may indicate that the corresponding wagering chip: (1) is not part of the specific chip tray table inventory as per the most recent scan or determination of the chip tray table inventor; and (2) does not qualify for application of specific chip transaction rules that add them as inventory chips (e.g., the chip belongs to a player).

The identification or recognition of a given wagering chip as either an inventory chip or a non-inventory chip, based on chip transaction rules and/or data stored in a memory (e.g., a memory accessible to the CGS, component of the smart table or a memory of the chip itself), may be initiated when the wagering chip is "sighted" or detected by a detecting component such as an RFID antenna. For example, in one embodiment the chip may first be identified by reading its Unique Universal Identifier (UUID)) of the table. The RFID Antenna or other detecting component may transmit the UUID and other chip information to the system (e.g., to the game controller). The system may initiate certain actions, events or sub-routines to either identify a current status of the chip as either inventory or non-inventory or, depending on the activity or transaction taking place with respect to the chip, change the status of the chip from non-inventory to inventory (e.g., based on certain logic or programming and whether certain conditions are satisfied, some of which are described herein).

Examples of rules the system may use to change the status of one or more wagering chips from non-inventory to inventory (i.e., examples of conditions, which, if satisfied, cause such a change in the status) include, without limitation: (i) determining that the wagering chip(s) is/are collected by the dealer from a player on a losing wager; (ii) determining that the wagering chip(s) is/are taken in by the dealer from the player on a completed Change Transaction; and (iii) identifying dealer movement of non-inventory chips off the dealer antenna. Examples of rules the system may use to change the status of one or more wagering chips from inventory to non-inventory (e.g., examples of conditions, which, if satisfied, cause such a change in the status) include, without limitation: (i) determining that the wagering chips have been paid as wager wins to players; (ii) determining that the wagering chips have been paid out from the chip tray on a completed Change Transaction; and (iii) determining that the wagering chips have been issued by the dealer to the player as part of a system confirmed/authorized buy-in transaction.

It should be noted that throughout the description herein, reference may be made to a "game controller", "controller", "system" or "casino game system" (CGS) performing a particular action or step. It should be understood that such references are for illustrative purposes only and that any such action or step described as being performed by a game controller may be performed by any component, or combination of components, of the table system described herein, as desired or appropriate.

DETAILED DESCRIPTION OF EXAMPLE EMBODIMENTS

Figure 1:
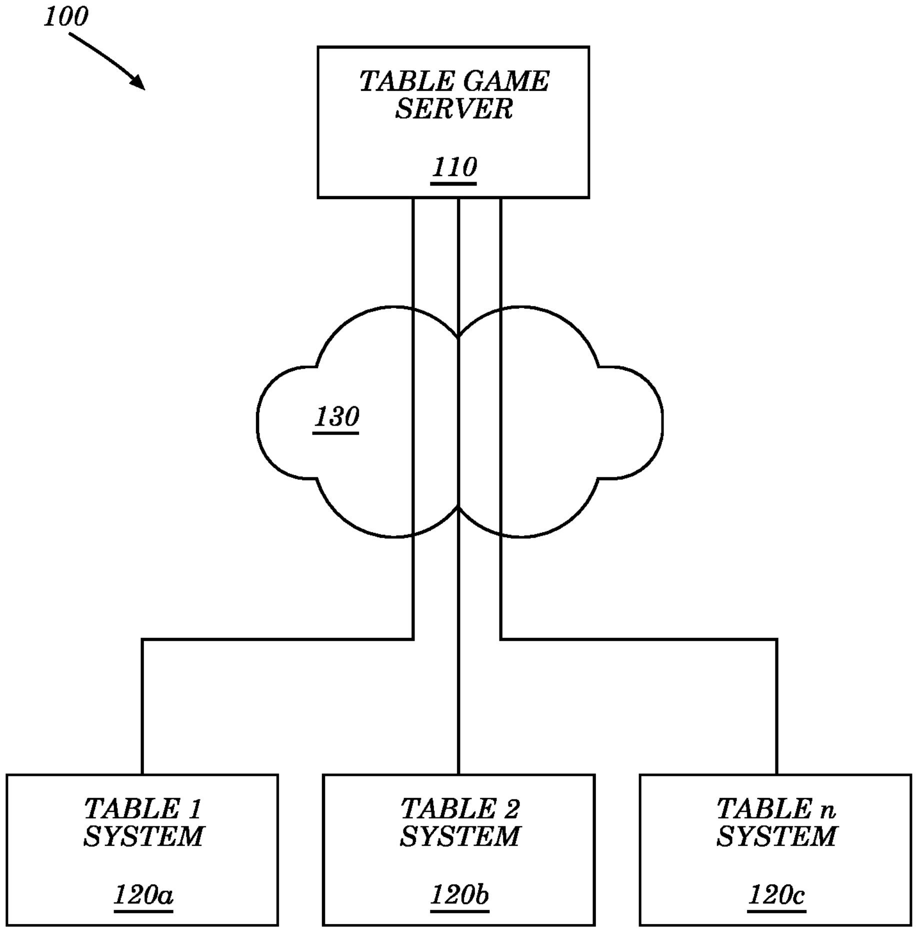
FIG. 1 illustrates an example system operable to facilitate at least some embodiments described herein.

The present embodiments are directed to tracking of activity at table games and within a gaming establishment, using radio frequency identification (RFID) technology, near field communication (NFC) or optical reading technology to track and manage RFID-enabled or other identifiable wagering chips (also referred to as "chips" herein) and wagering activity utilizing such chips and particularly to tracking and facilitating Change Transactions being conducted via a dealer antenna or other detecting component of such a table.

As described herein, in accordance with some embodiments, a Change Transaction is inferred or identified by the game controller automatically once one or more predetermined condition is satisfied. For example, the system may infer or conclude that a Change Transaction is being conducted when both of the following types of chips are detected at the dealer antenna at the same time: at least one wagering chip corresponding to a status of "inventory" and at least one wagering chip corresponding to a status of "non-inventory." In some embodiments, the game controller may infer that the Change Transaction is being requested upon determining this condition and automatically proceed to initiate a Change Transaction subroutine. In other embodiments, the game controller may first output a request for confirmation to a dealer before proceeding with the Change Transaction sub-routine (e.g., the system may output a message to the dealer via the dealer display 758 (FIG. 4), such as "Initiate Change Transaction?"). In other embodiments (e.g., such as those illustrated and described with respect to FIGS. 6A-6D, the system may not directly ask a dealer to affirmatively confirm that a Change Transaction or other specific inferred transaction is being conducted but may begin outputting information and interfaces to the dealer that are appropriate for that type of transaction and, if the dealer disagrees as to the type of transaction that was inferred by the system, the dealer may be provided with an opportunity to so indicate to the system via such interfaces. Such an indirect method of informing the dealer that the system has inferred a particular type of transaction is being conducted and thus the system has entered the appropriate mode or initiated the appropriate sub-routine for facilitating the particular type of transaction may be preferred as not unnecessarily slowing down the pace of game play (i.e., because the dealer is not required to either take the time to initiate the appropriate sub-routine or mode himself/herself or take time away from processing the transaction in order to provide additional confirmations to the system in response to additional prompts). Players and game providers strongly prefer a fast and uninterrupted pace of game play and any improvements to the system and process flows that would reduce disruptions to the pace of game play will result in increased efficiency and profitability for the game provider.

In some embodiments, systems are provided which perform functions responsive to data obtained via a detecting component of the table, such as an RFID antenna operable to read data from RFID-enabled chips, an NFC antenna operable to read data from an NFC tag of a chip or an optical reading component operable to read data from a wagering chip having optical data encoded thereon. In particular, data read by an RFID antenna or other detecting component at a dealer position is utilized to obtain a unique identifier of chips placed on the dealer position. Wagering chips are referred to as being placed on a dealer antenna when they placed in an area of the table such that they are within a detection range of the dealer antenna.

It should be noted that chips being detected on a "dealer antenna" or being present on a "dealer antenna" are intended to convey that such chips have been detected or recognized by a detecting component of a table as being within a particular area of a table (e.g., within an area in which a dealer places chips in order to process certain transactions being conducted on the table, such as buy-ins, payouts and change transactions). The use of the term "dealer antenna" is not intended to reference any particular type of technology being utilized to so detect or identify the presence of such chips. Thus, whether a detecting component comprises an RFID antenna, an NFC detecting mechanism, an optical recognition reader or other technology, for purposes of brevity, recognition by such detecting component of chips within an area of detection corresponding to such detecting component is referred to as recognition by a dealer antenna of chips being "on the dealer antenna", being "placed on the dealer antenna" or being recognized "by the dealer antenna."

It should be noted that a "bet spot" or a "wager placement position", whether physical or virtual, refers to an area of a card game table or an area of a virtual card game representation (e.g., a graphical representation of a virtual table) on which a representation or indication of a wager may be placed or output. Thus, for example, a bet spot or wager placement position may comprise a specifically designated or identifiable area on which a person (e.g., player or dealer) may place at least one gaming element (e.g., a wagering chip or token) to indicate placement of a wager. It should further be noted that a gaming element may be a physical wagering element (e.g., a physical wagering chip, in the context of a physical table) or a virtual wagering element (e.g., a graphical representation of a wagering chip, as may be depicted on a graphical representation of a virtual table). In some embodiments, reference is made to "wagering chips" which reference should be understood to refer to either physical wagering chips or virtual wagering chips, depending on the context. Although at times embodiments are described with reference to wagering chips, such embodiments can also be implemented using other types of gaming elements (e.g., tokens, lammers, etc.) useful for indicating placement of a wager and the embodiments described herein are not dependent on any particular form of gaming element for indicating placement of a wager.

Prior to applicant's invention, dealers of casino games performed Change Transactions without aid of RFID components, detection mechanisms or game controller verifications as described herein and this often resulted in errors (e.g., too much value in chips was paid out by the dealer in a Change Transaction). Such errors would result in variances in the expected chip inventory of the dealer's chip tray at the end of the dealer's shift. It would be difficult to back-track any discrepancies to any particular transaction, much less a Change Transaction. For some transactions (e.g., Change Transactions over a certain amount), a supervisor may have been called in to oversee the transaction and reduce the occurrence of an error. In some casinos, the transaction may have been "splashed", meaning that an overhead video camera may have been focused on the dealer work area and a video recording may have been made of the transaction, or casino personnel would have viewed the Change Transaction remotely as it was being performed by the dealer. But these practices have proved insufficient to detect errors in a vast majority of Change Transactions or in providing an operator the ability to back-track a variance in the expected chip inventory of a dealer's chip tray to an error in a particular Change Transaction.

The systems and methods described herein reduce the chances of dealer errors when making Change Transactions and/or provide a clear log or record of the Change Transactions in which an error apparently occurred, allowing a determination at a subsequent time (e.g., at the end of a dealer's shift) as to whether an error in a Change Transaction may be a cause of a discrepancy in an expected chip inventory of a dealer's chip tray. In accordance with some embodiments, these errors may be reduced (or at least documents, thus allowing for subsequent identification of a cause of an error) by having the table system facilitate a Change Transaction sub-routine automatically when a Change Transaction is inferred from the presence of both inventory and non-inventory chips on the dealer antenna (or, in some embodiments, in response to an indication by a dealer that a Change Transaction is being initiated).

In accordance with some embodiments, a Change Transaction sub-routine may be performed with a goal of minimizing disruption of game flow and/or inputs or required additional actions (additional to the physical actions the dealer is performing during a Change Transaction, such as putting chips onto the dealer area and removing them therefrom). For example, the Change Transaction sub-routine may be initiated and performed by the system in the background, without requiring the dealer to manually initiate it or requiring any inputs or confirmations from the dealer as it is being performed (in some embodiments, minimal inputs or confirmations from the dealer may be requested).

Goals or intended benefits of the systems and processes described herein include, in some embodiments, the avoidance or minimization of taking the dealer's attention from the chips/table by having him/her read and respond to prompts on a dealer screen or to provide confirmations for data output to the dealer on the screen. Accordingly, while a dealer may (in some embodiments) be initially requested to confirm that a Change Transaction is being performed when the system detects both inventory and non-inventory chips on the dealer antenna, the remainder of the Change Transaction sub-routine (e.g., determining the value of the inventory chips on the dealer antenna, determining the value of the non-inventory chips on the dealer antenna, comparing the values, determining that a completion condition for the Change Transaction has been satisfied and storing the Change Transaction as either a completed Change Transaction or a cancelled or incomplete Change Transaction depending on whether the values are equal) may be performed by the system in the background and without requiring additional input, or with minimal input, from the dealer.

In accordance with some embodiments, wagering chips that are detectable at a smart table comprise RFID-enabled wagering chips that include RFID components operable to store data readable by an RFID detecting component (e.g., an antenna). In other embodiments, wagering chips that are detectable at a smart table comprise wagering chips that include optically readable data that is readable by an optical imaging component (e.g., an imager or camera). In either embodiment, the detecting component (whether it be an RFID detecting component, an optical imaging component or another type of detecting component) may be operable to communicate data it receives from the wagering chips, or otherwise reads or determines from the wagering chips, to a game controller or processor. In yet other embodiments, the detecting component may comprise different technology, such as an NFC antenna operable to communicate with, or read data from, NFC tags included on one or more wagering chips. For purposes of clarity, some embodiments will be described herein with reference to RFID-enabled wagering chips but it should be understood that such embodiments may also be implemented using wagering chips comprising other technology, in lieu of or in addition to RFID technology. For example, gaming elements may, in some embodiments, have optically readable data encoded or represented thereon and the table may comprise an optical imaging detecting component or gaming elements may include an NFC tag and the table may comprise an NFC antenna detecting component.

In accordance with some embodiments, an electronic table system for facilitating a game comprises (i) at least one physical table including a first number of physical wager placement positions, each of the physical wager placement positions corresponding to a respective area of a physical table surface on which a gaming element may be placed in order to indicate a particular wager made by a player (e.g., player wagers on "Player" outcome in a baccarat deal or player places a wager on a hand of blackjack); (ii) a detecting mechanism operable to detect a gaming element being placed on and removed from a particular physical wager placement position of the first number of physical wager placement positions; (iii) a display device; and (iv) a game controller operable to track multiple distinct wagers placed on a single physical wager placement position of the plurality of physical wager placement positions by performing a method. In accordance with some embodiments, the method performed by the game controller includes: (i) identifying a plurality of gaming elements detected by a dealer antenna or other detecting component corresponding to a dealer area of the table; and (ii) identifying, by looking up the inventory/non-inventory status of each gaming element based on the unique identifier (UUID) of each unique identifier, a status of each gaming element of the plurality of gaming elements; (iii) determining that both inventory and non-inventory gaming elements are present on the dealer antenna, thereby identifying a Change Transaction is being initiated; (iv) determining a sum of values of all gaming elements on the dealer antenna corresponding to an inventory status, thereby determining a first value; (v) determining a sum of values of all gaming elements on the dealer antenna corresponding to a non-inventory status, thereby determining a second value; (vi) comparing the first value to the second value; (vi) determining that a completion condition for the Change Transaction has been satisfied; and (vii) storing the Change Transaction as either (a) a completed Change Transaction if the first value is equal to the second value, or (b) an incomplete Change Transaction if the first value is not equal to the second value.

In accordance with some embodiments, a system is provided which includes at least one table having a plurality of RFID detecting component (e.g., an RFID antenna) placed thereon, for use in recognizing the placement of an RFID-enabled wagering chip or other gaming element on one or more wager placement positions of the table or associated with other components or areas of the table (e.g., an RFID-enabled chip tray). In accordance with other embodiments, the system includes (in lieu of or in addition to the RFID detecting component(s)), at least one optical image detecting component for detecting, via optical imaging technology, at least one wagering chip or other gaming element on the one or more wager placement positions of the table or elsewhere on the table (e.g., within a chip tray).

A table system comprising RFID components may be referred to herein as an RFID-enabled table. An RFID-enabled table, as the term is used herein, comprises a table operable to facilitate a game (e.g., a card game such as baccarat or blackjack) and equipped with at least one RFID antenna or other RFID component (described in more detail elsewhere herein). In other embodiments, the table system may be an imaging-enabled table or include other types of technology that serves as the mechanism via which data (e.g., wagering data or other game-related data) is gathered by the table system.

Examples of an RFID-enabled table that may be useful for at least some embodiments described herein are described in (i) U.S. Patent Publication No. 2016/0016071, filed on Sep. 28, 2015 in the name of Walker et al. and entitled RFID SYSTEM FOR FACILITATING SELECTIONS AT A GAME APPARATUS; (ii) U.S. Pat. No. 9,262,885 filed on Jun. 5, 2012 in the name of Moore et al. and entitled METHODS AND SYSTEMS FOR FACILITATING TABLE GAMES, each of which is incorporated by reference herein. Some examples of other technologies (such as optical imaging technologies) that may be utilized to implement at least some embodiments described are described in the following patents: (i) U.S. Pat. No. 5,782,647 to Fishbine et al.; (ii) U.S. Pat. No. 5,103,081 to Fisher et al; (iii) U.S. Pat. No. 5,548,110 to Storch et al.; and (iv) U.S. Pat. No. 4,814,589 to Storch et al. Each of the foregoing patents are incorporated by reference herein and disclose various systems and methods for encoding information on wagering chips or other gaming elements and for determining information encoded in the color, geometry, size or patterns on a wagering chip in accordance with some embodiments described herein.

A table that is equipped with RFID-enabled technology, optical imaging technology or other technology that allows reading of data from one or more game elements used for games playable on the table is referred to as an electronic table or a smart table herein. For purposes of clarity, the example embodiments described herein will primarily refer to an RFID-enabled table but it should be understood that some embodiments may alternately be implemented using an optical imaging-enabled electronic table that utilizes imaging technology to read data from game elements (e.g., to read bar codes or other codes embedded in or included on one or more wagering chips). The embodiments described herein are not limited to implementations utilizing RFID or optical imaging technology, other technologies may be substituted for detecting the presence (or removal of) a wagering chip(s) on a player position or bet spot, as well as for reading data from the wagering chip(s).

Figure 3:
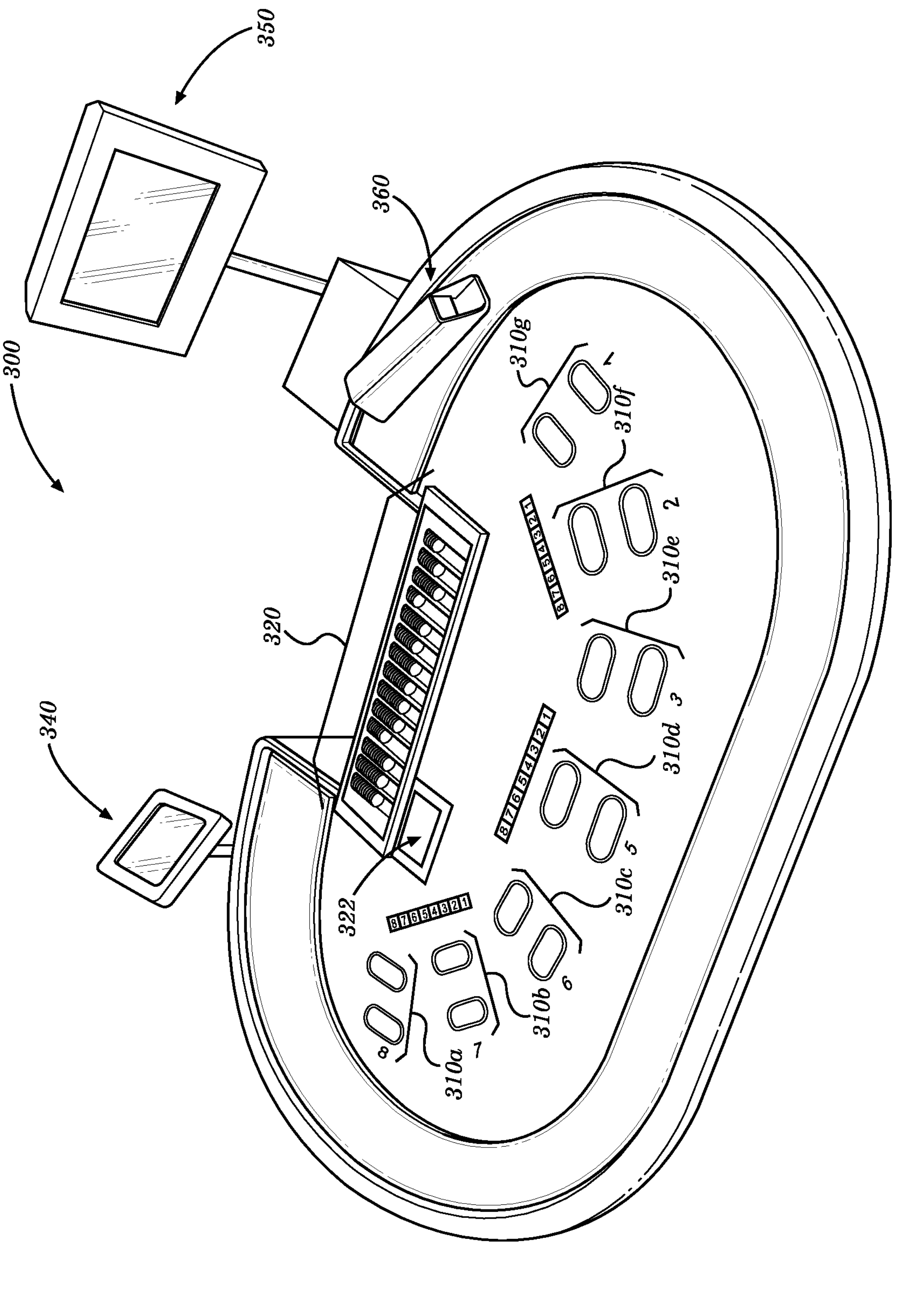
FIG. 3 illustrates a top planar view of a smart table for facilitating a baccarat game, in accordance with some embodiments.

In accordance with some embodiments, a smart table system includes a dealer display (e.g., as illustrated in FIG. 3), which may comprise a display facing the dealer and for outputting information to the dealer. The dealer display may, in some embodiments, be operable to receive data and/or instructions from a processor (e.g., a processor integrated with the dealer display, a processor of CGS 750 (FIG. 4) or another game controller, another processor of the table at which the dealer display is located and/or a remote processor of a server device) and to output information to the dealer based on this data and/or instructions. The data and/or instructions may be based on data read from one or more RFID-enabled chips in the RFID-enabled chip tray, the RFID antenna of the dealer area of the table or elsewhere on the table.

Various systems and several examples are provided herein. The present disclosure will focus on baccarat as an example, but it should be appreciated that similar functionality may be applied to other RFID-enabled table games such as blackjack, roulette, craps, Sic Bo, Pai Gow (tile and poker variations), LET IT RIDE™, CARIBBEAN STUD™, 3-CARD POKER, 4-CARD POKER, SPANISH 21, variants of such games (e.g., Chemin de Fer), and the like.

Referring now to FIG. 1, illustrated therein is a system 100 which may be useful in implementing at least some embodiments described herein. The system 100 may comprise, for example, a system within a particular gaming establishment which includes a plurality of smart tables for facilitating card games. In accordance with at least some embodiments, the system 100 includes a table game server 110 (e.g., for managing chip, player and/or game activities at one or more connected smart tables, providing data for a particular player placing a wager at a table from a global player database, etc.) that is in communication, via a communications network 130, with one or more table systems 120. The table game server 110 may communicate with the table systems 120 directly or indirectly, via a wired or wireless medium such as the Internet, LAN, WAN or Ethernet, Token Ring, or via any appropriate communications means or combination of communications means. Each of the table systems 120 may comprise computers, such as those based on the INTEL® PENTIUM® processor, that are adapted to communicate with the table game server 110. Any number and type of table systems 120 may be in communication with the table game server 110, although only three (3) are illustrated in the example of FIG. 1.

Communication between the table systems 120 and the table game server 110, and (in some embodiments) among the table systems 120, may be direct or indirect, such as over the Internet through a Web site maintained by table game server 110 on a remote server or over an on-line data network including commercial on-line service providers, bulletin board systems and the like. In yet other embodiments, the table systems 120 may communicate with one another and/or table game server 110 over RF, cable TV, satellite links and the like.

Some, but not all, possible communication networks that may comprise network 130 or otherwise be part of system 100 include: a local area network (LAN), a wide area network (WAN), the Internet, a telephone line, a cable line, a radio channel, an optical communications line, a satellite communications link. Possible communications protocols that may be part of system 100 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In some embodiments, the table game server 110 may not be necessary and/or preferred. For example, at least some embodiments described herein may be practiced on a standalone table system 120 and/or a table system 120 in communication only with one or more other table systems 120 or a dedicated server device. In such an embodiment, any functions described as performed by the table game server 110 or data described as stored on the table game server 110 may instead be performed by or stored on one or more table systems 120.

Figure 2:
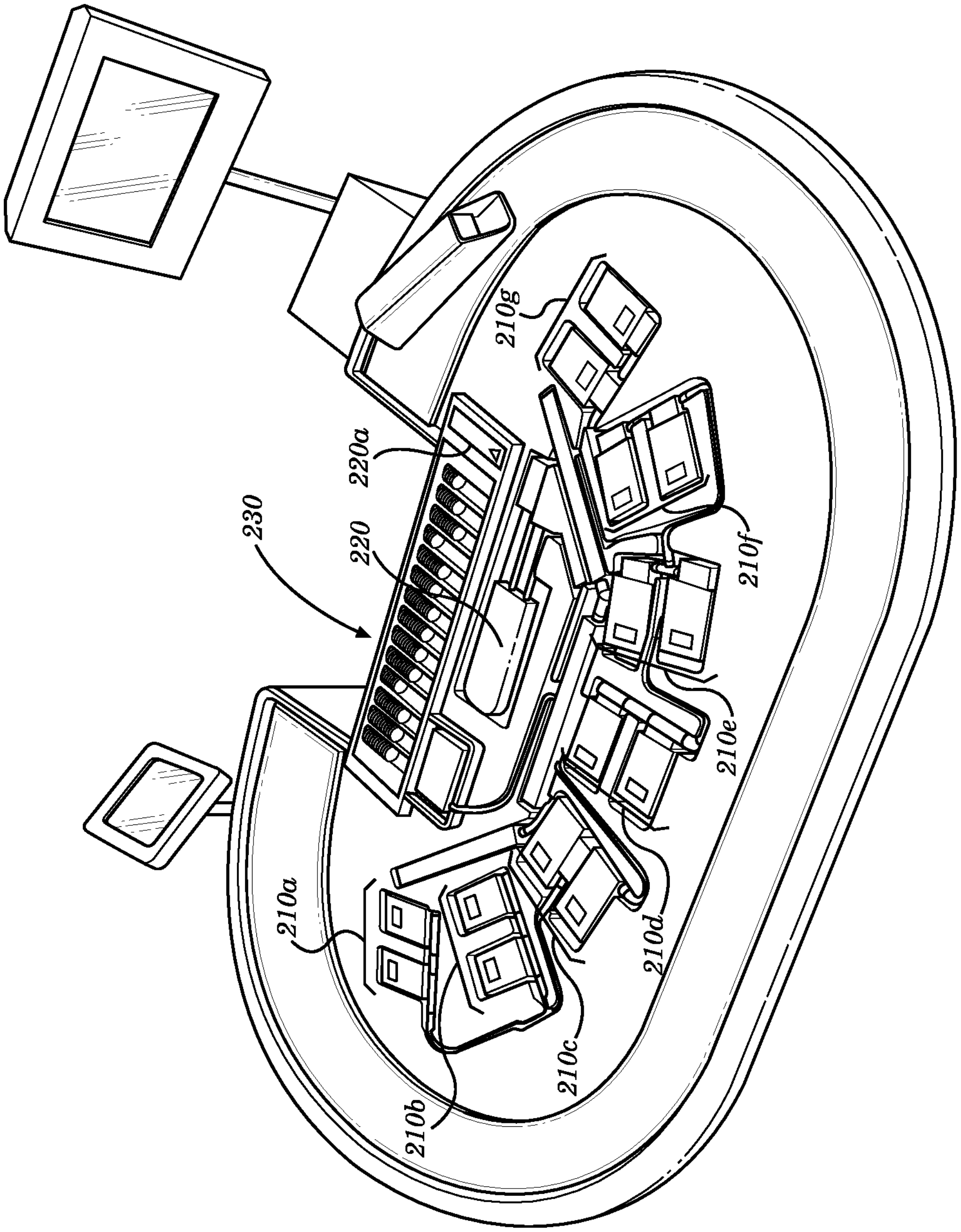
FIG. 2 illustrates a diagram of an RFID antenna layout on a smart table for facilitating a baccarat game, in accordance with some embodiments.

Referring now to FIG. 2, illustrated therein is one embodiment of how a plurality of antennas may be placed on a table (which may be one embodiment of table system 120 of FIG. 1), in a manner that facilitates some of the embodiments described herein. The table illustrated in FIG. 2 includes seven (7) distinct player positions arranged in a semicircular configuration. Placed at each respective player position is a set of two antennas 210*a*-210*g*, one for each bet spot or wager placement position available at each respective player position. For example, one antenna at a respective wager placement position at a particular player station (e.g., area of a physical table in front of a particular player seat) may be for recognizing a bet on Banker (e.g., recognizing RFID-enabled chips placed on the Banker bet spot) and the other antenna may be for recognizing a bet on Player (e.g., recognizing RFID-enabled chips placed on the Player bet spot). Thus, if a player were to place a wager (e.g., one or more RFID-enabled chips, a stack of chips) on a bet spot associated with one of the antennas at the wager placement position associated with the set of antennas 210*a*, the appropriate antenna (Banker bet antenna or Player bet antenna) would recognize such placement (i.e., the antenna nearest to which the chips are placed would "acquire" the chip(s) comprising the wager).

The table illustrated in FIG. 2 further comprises a dealer area at which is positioned an antenna 220. The dealer area antenna 220 may facilitate, for example, Change Transactions in accordance with embodiments described herein, as well as other function such as, for example, calculations and verifications of stack totals for table fills, credits and buy-ins (e.g. by reading and providing data regarding one or more chips acquired by the dealer area antenna 220).

In some embodiments, a smart table such as that illustrated in FIG. 2 may include an RFID-enabled chip tray 230 within which is placed at least one antenna 220A. In one embodiment, the chip tray antenna(s) 220A may interact with the dealer area antenna 220 (or a processor which receives data from both the chip tray antenna(s) 220A and the dealer area antenna 220 may take into account the data of the antenna(s) 220A along with the data of the antenna 220) to ensure that wagering chips implicated in certain transactions (e.g., wagering chips included in a Fill transactions) are actually recognized as having been placed into the chip tray after being counted and confirmed on the dealer antenna.

The antennas incorporated into a table such as the table illustrated in FIG. 2 may be placed within an insert under the felt or other covering of the table. Each antenna may have a predetermined range within which it recognizes, determines, identifies or acquires a chip. Thus, if one or more chips comprising a wager is placed within the acquire range of a particular antenna, it may be inferred or determined that a player (e.g., the player who is associated with the acquired chip(s)) is placing a bet on the bet spot associated with the antenna.

It should be noted that the number and placement of antennas illustrated in FIG. 2 is exemplary only and should not be construed in a limiting manner. An antenna such as any of those illustrated with respect to FIG. 2 may determine, read, receive, obtain, recognize or determine various information or data from or about an RFID-enabled chip placed within a predetermined range of the antenna. The following are examples or some of the information or data that may be so determined: (i) a unique chip identifier, which uniquely identifies the chip (and which may be utilized to determine additional information associated with the chip, such as an inventory/non-inventory status of the chip as stored in a database); (ii) a currency of the chip; (iii) a denomination of the chip (which may be its monetary value; in the case of a token it may comprise the token type); (iv) a chip set identifier, which differentiates types of chips or represents a category of a chip (e.g., cash vs. non-negotiable, promotional, differentiating tokens from monetary chips, chip validity); (v) a casino identifier that uniquely identifies a casino or other registered gaming corporation associated with the chip (this information may also be used to determine chip validity); and (vi) a site identifier that uniquely identifies the physical casino site for which the chip is valid. It should be noted that not all of the above information is necessary or desirable for all embodiments. It should further be noted that any or all of the above-listed information may be stored in a memory of a given chip and transmitted to an antenna via a signal from the chip.

An RFID-enabled chip which may be used in at least some embodiments may include (i) an RFID tag or memory, (ii) an electronic circuit or processor and (iii) an antenna. An RFID-enabled chip usable in at least some embodiments may be similar or identical to those disclosed in U.S. Pat. Nos. 5,166,502; 5,676,376; 6,021,949; and 6,296,190, and U.S. Patent Application Publication Nos. 2004/0207156 and 2004/0219982 which are all incorporated by reference in their entireties. No particular type of RFID-enabled chip is required for the embodiments described herein, so long as the chip can support the functionality described with respect thereto. In some embodiments, each chip may store in its memory (and communicate to, or make available for reading by, an antenna or other detecting component of a table as described herein) a unique serial number, a chip set identifier, an associated player identifier or other information. The gaming establishment (e.g., casino) or other entity may associate values, categories, denominations or other values with each serial number. The association may be in a look-up table or the like. Alternatively, the unique identifier of a given chip may be encoded to include information therein. Likewise, a chip may be color-coded or include other indicia that indicates a value or other information to the player or dealer. In some embodiments, other types of gaming elements such as plaques may be used instead of chips (e.g., for exceedingly large denominations).

In some embodiments, an RFID-enabled chip may be an active chip which includes its own battery or power source. In other embodiments, an RFID-enabled chip may be a passive chip which does not include its own power source. In one embodiment, an electronic circuit and antenna of a given chip may act as a transponder capable of responding to an antenna of the table (e.g., an antenna of an RFID-enabled chip tray of the table). The antenna may be a sensor or other detecting component operable to detect, recognize, determine, identify or sense the presence (or absence) of an RFID-enabled chip, a wagering chip having optically detectable indicia or data encoded thereon or another type of gaming element. The antenna or other detecting component may also be operable to detect, determine, identify, recognize or receive various information about a chip (e.g., chip identifier, chip set identifier, chip denomination, chip status, etc.). The antenna, imaging device or other detecting component of a table or chip tray may also be operable to transmit information to one or more processors or memories of a game controller or other computing device (e.g., information regarding the presence or absence of a chip in a certain location, an identifier of a chip, etc.). Such one or more processors or memories may be components of (i) a table, (ii) a component of a table (e.g., of a dealer display or chip tray) and/or (iii) a server device operable to communicate with one or more tables.

In accordance with some embodiments, an antenna of a table (e.g., an antenna of the set of antennas 210*a* and/or an antenna 220A of a chip tray) may send out an electromagnetic signal that impinges upon the antenna of an RFID-enabled chip, exciting a current within electronic circuit of the chip. In response to the excited current, the electronic circuit of the chip may cause the antenna of the chip to emit a second electromagnetic signal as a response, which is received by the antenna of the table which had sent out the electromagnetic signal. The second signal may comprise identifying information about the chip such that the antenna can identify the chip on receipt of the second signal. The second signal may be generated passively or actively. That is, in a first embodiment, the energy from the interrogation signal provides sufficient power for the electronic circuit of the chip to use to send the second signal. In a second embodiment, the electronic circuit of the chip may include a battery or other power source, which is used to power the generation of the second signal.

In accordance with some embodiments, an antenna or other detecting mechanism of a table (e.g., an antenna or other detecting mechanism of a physical wager placement position that is operable to detect the presence (or lack thereof) of a gaming element on the physical wager placement position) may also be operable to transmit information to one or more processors or memories (e.g., information regarding the presence, absence or movement of a chip in a certain location, an identifier and/or denomination of a chip, etc.). Such one or more processors or memories may be components of (i) a table system, (ii) a component of a table system (e.g., of a dealer display or chip tray) and/or (iii) a server device operable to communicate with one or more table systems. In accordance with some embodiments (e.g., when referring to a processor of a smart table), such one or more processors and memories may be referred to as a "game controller" or Core Gaming System (CGS). As described in more detail elsewhere herein, a game controller or CGS may be operable to perform certain functions with respect to a smart table, such as (i) controlling the polling (e.g., reading or requesting data from) one or more RFID antennas or other detecting components of the table system; (ii) analyzing or interpreting such data to determine wagering activity at the physical table; (iii) processing such data to determine actions, outputs or signals that should be undertaken based on such data and/or (iv) storing chip placement information (e.g., information about RFID-enabled wagering chips placed on physical wager placement positions of the table, such as the identifiers and/or denominations of wagering chips and which wager placement positions they have been placed on or removed from). A game controller or CGS may comprise specialized hardware, software or a combination of hardware and software, operable to perform at least some of the functionalities described herein.

In one embodiment, a CGS may poll one or more antennas or other detecting components of a smart table (e.g., in accordance with a schedule or program and/or in response to events in a hand being played on the table) in order to obtain or receive data therefrom. Thus, in some embodiments, the CGS may received data from one or more RFID antennas upon polling the antenna and requesting such data (in other embodiments an RFID antenna may more proactively transmit data to the CGS or another processor independent polling functionality). In accordance with some embodiments the CGS may determine, based on the data received from one or more RFID antennas, (i) information that should be output on a dealer display and/or one or more dealer displays, (ii) a payout that should be made to a player; (iii) a commission that should be collected by a dealer; (iii) whether an additional wager may be accepted based on a status of a game event; (iv) whether a Change Transaction process should be performed (e.g., a Change Transaction sub-routine, such as that described with respect to FIG. 5, should be initiated).

Referring now to FIG. 3, illustrated therein is a planar view of a smart table 300, which may be operable to facilitate one or more embodiments described herein. The table 300 may comprise the table of FIG. 2, but with a felt or other covering hiding the antennas placed underneath. In many respects, the smart table 300 may appear to a player as a regular baccarat table, with the RFID capabilities of the table not being readily discernable. The table 300 is configured for a baccarat game but the embodiments described herein are not limited to baccarat and a similar table may be provided with a top layout appropriate for facilitating another game (e.g., blackjack, roulette or poker).

The rules of baccarat are well understood, but the interested reader is directed to www.wizardofodds.com/baccarat for a more detailed explanation. Table 300 comprises a smart table configured to facilitate a baccarat game and includes a dealer area within which is located a dealer display 322 and an RFID-enabled chip tray 320. The dealer display may be utilized to output data or prompts to a dealer during the course of game play (e.g., to confirm whether a Change Transaction is being conducted, that the respective values of inventory and non-inventory chips involved in a Change Transaction are not equal, a commission amount to be collected from one or more players, a payout to be provided to one or more players, an amount in lost wagers to be collected from one or more players, an alert which is to be attended to by the dealer, etc.).

The table 300 further includes seven (7) player positions 310*a*-310*g*, each player position including a Banker bet spot and a Player bet spot. In some embodiments, each player position may comprise a single bet spot (e.g., in a Blackjack or other type of card game). Of course, any number of player positions may be utilized. Further, in some embodiments the table may include bet spots in addition to bet spots at player positions, such as shared or common bet spots.

The table 300 further includes a display 340 which a dealer or other gaming establishment personnel may utilize to access information regarding game events, transactions and other data related to the table 300.

The table 300 further includes another display 350 which faces the players and may show data to players such as recent historical outcomes (sometimes referred to as a "trend board"). Players sometimes use such historical outcomes in an effort to predict trends within a series of game instances. In some embodiments, the display 350 may output a virtual representation of the table and/or wager status on all wager placement positions, including any virtual bets placed by remote players.

The table 300 further includes an electronic card shoe 360 via which cards for the game are dealt and, in some embodiments, shuffled (in other embodiments cards are shuffled outside the shoe or pre-shuffled cards are used within the shoe or a shoe is not utilized at all). In accordance with some embodiments, the electronic card shoe 360 may communicate with a processor (e.g., a processor of the table 300, such as a process of a game controller component of the table 300) to communicate data regarding cards dealt and/or remaining in the shoe.

The table 300 may include additional components (at least some of which may not be easily visible to a player or other observer) such as one or more processors, a memory storing a general program and one or more specialized software applications which, in combination with data obtained from the RFID antennas located on the table, may facilitate many of the functions described herein (e.g., processing Change Transactions, tracking a status of chips or an update in a status of a chip).

Figure 4:
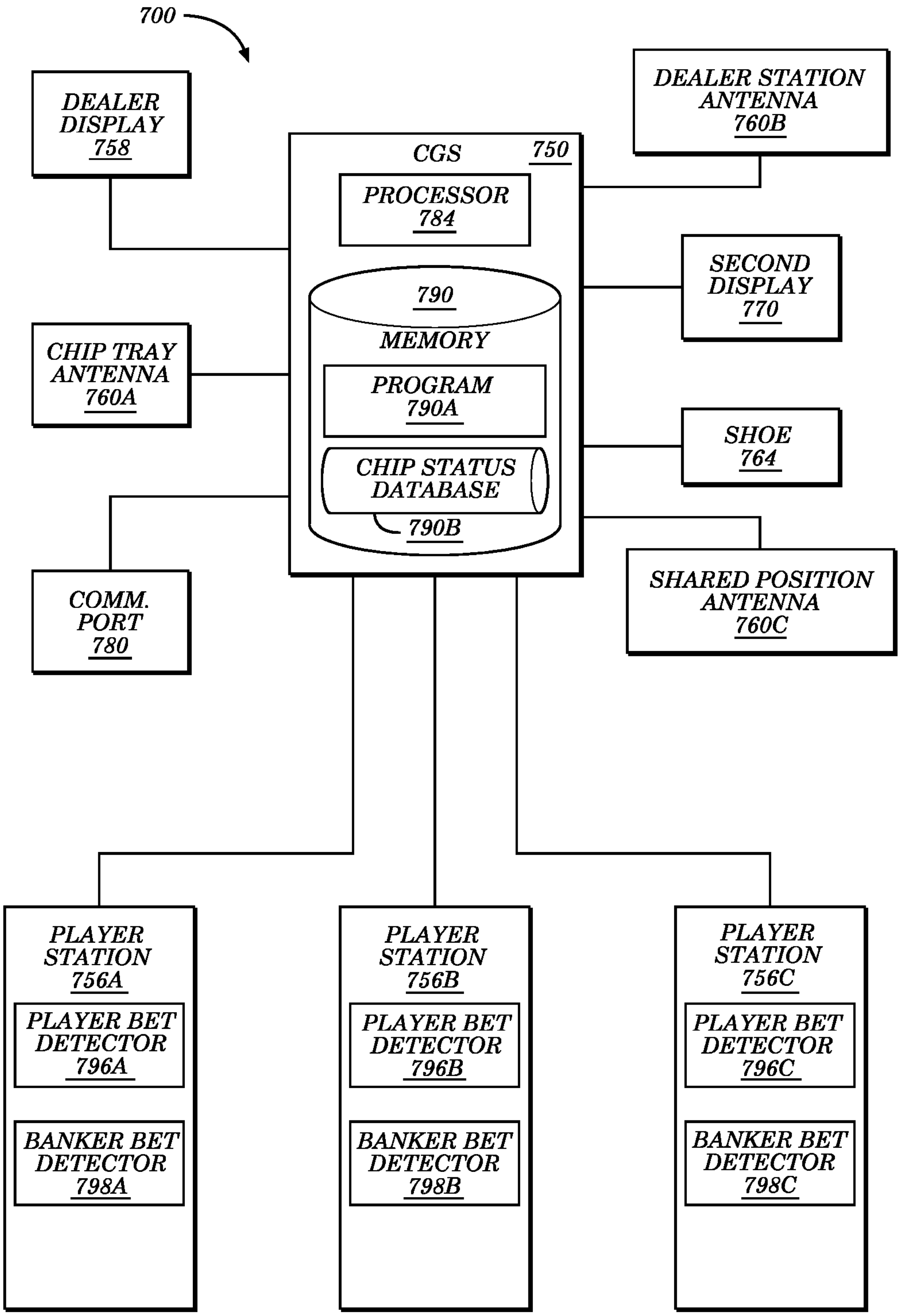
FIG. 4 illustrates a block diagram of a table system operable to facilitate at least some embodiments described herein.

Referring now to FIG. 4, illustrated therein is a block diagram of a table system 700 consistent with some embodiments described herein. The table system 700 may comprise, for example, a table system 120 of FIG. 1. The table system 700 may be implemented as a system controller, a dedicated hardware circuit, an appropriately programmed computer which is a component or peripheral device of a table for facilitating a card game, or any other equivalent electronic, mechanical or electro-mechanical device.

The table system 700 comprises a CGS 750, which includes at least one a processor 784, such as one or more INTEL® PENTIUM® processors. The processor 784 may be in communication with a memory 790 and a communications port 780 (e.g., for communicating with one or more other devices). The memory 790 may comprise an appropriate combination of magnetic, optical and/or semiconductor memory, and may include, for example, Random Access Memory (RAM), Read-Only Memory (ROM), a compact disc, tape drive, and/or a hard disk. The memory 790 may comprise or include any type of computer-readable medium. The processor 784 and the memory 790 may each be, for example: (i) located entirely within a single computer or other device; or (ii) connected to each other by a remote communication medium, such as a serial port cable, telephone line or radio frequency transceiver. In some embodiments, the table system 700 may comprise one or more devices that are connected to a remote server computer for maintaining databases.

The memory 790 may store a program 790A for controlling the processor 784. The processor 784 may perform instructions of the program 790A, and thereby operate in accordance with at least one embodiment described herein. The program 790A may be stored in a compressed, uncompiled and/or encrypted format. The program 790A may include program elements that may be necessary or desirable, such as an operating system, a database management system and "device drivers" for allowing the processor 784 to interface with computer peripheral devices (e.g., detecting components such as the RFID antenna, an RFID-enabled chip tray, an electronic shoe, a camera, any of which may provide data to the processor 784). Appropriate program elements are known to those skilled in the art, and need not be described in detail herein. In accordance with some embodiments, program 790A, a subroutine or module of program 790A or another program stored in memory 790 (or otherwise accessible to processor 784) may comprise instructions for applying at least some of the processes or functionalities described herein (e.g., determining and/or confirming, based on data received from at least one detecting component, that both inventory and non-inventory wagering chips have been detected at a dealer antenna and thus inferring that a Change Transaction is being processed by the dealer). Process 500 (FIG. 5) is an example of a subroutine or process that may be stored in memory 790, such as a part of program 790A.

The term "computer-readable medium" as used herein refers to any medium that participates in providing instructions to processor 784 (or any other processor of a device described herein) for execution. Such a medium may take many forms, including but not limited to, non-volatile media, volatile media, and transmission media. Non-volatile media include, for example, optical or magnetic disks, such as memory 790. Volatile media include dynamic random access memory (DRAM), which typically constitutes the main memory. Transmission media include coaxial cables, copper wire and fiber optics, including the wires that comprise a system bus coupled to the processor 784. Transmission media can also take the form of acoustic, electromagnetic, or light waves, such as those generated during radio frequency (RF), microwave, and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Various forms of computer readable media may be involved in carrying one or more sequences of one or more instructions to processor 784 (or any other processor of a device described herein) for execution. For example, the instructions may initially be borne on a magnetic disk of a remote computer. The remote computer can load the instructions into its dynamic memory and send the instructions over a telephone line using a modem. A modem local to a table system 700 may be operable to receive the data on the telephone line and use an infrared transmitter to convert the data to an infrared signal. An infrared detector can receive the data carried in the infrared signal and place the data on a system bus for processor 784. The system bus may carry the data to a main memory, from which processor 784 may retrieve data and execute instructions. The instructions received by main memory may optionally be stored in memory 790 either before or after execution by processor 784. In addition, instructions may be received via communication port 780 as electrical, electromagnetic or optical signals representing various types of information. According to some embodiments of the present invention, the instructions of the program 790A may be read into a main memory from another computer-readable medium, such from a ROM to RAM. Execution of sequences of the instructions in program 790A may cause processor 784 to perform at least some of the functions described herein. In alternate embodiments, hard-wired circuitry may be used in place of, or in combination with, software instructions for implementation of at least one embodiment described herein. Thus, embodiments described herein are not limited to any specific combination of hardware and software.

The memory 790 may also store at least one database, such as chip status database 790B. In some embodiments, some or all of the data described herein as being stored in the database 790B may be partially or wholly stored (in addition to or in lieu of being stored in the memory 790 of the table system 700) in a memory of one or more other devices, such the table game server 110 (FIG. 1). In accordance with some embodiments, the chip status database may store chip identification data and/or chip status data (e.g., a status indication such as whether the chip is currently classified as an inventory chip or a non-inventory chip, denomination, unique chip identifier (e.g., UUID), chip set identifier, gaming establishment identifier, chip value, player identifier associated with chip identifier, bankroll identifier associated with a chip identifier, validity of chip, etc.). In some embodiments, the memory 790 may store additional data regarding movement, location or wagering activity which has occurred on the table. For example, chip movement history (e.g., an indication of which antennas or table bet positions a particular chip has been acquired at, a time at which it was acquired at a particular antenna, a time at which it was determined to no longer be at that antenna, etc.) may be stored. In some embodiments, a history of chip movements may be stored (e.g., in a file-based archive log) on another device (e.g., in a memory of table game server 110 of FIG. 1).

In some embodiments, chip status database 790 or another table or memory device may be used to dynamically track stacks of chips or wagers for a game event. For example, the database or table may be updated as data is received from the dealer antenna (e.g., based on inventory chips being placed onto and then removed from a dealer antenna) and the CGS 750 may determine whether to change the status of the chips from inventory to non-inventory based on rules for determining such status. The CGS may be programmed (e.g., via program 790A) to recognize that if one or more inventory wagering chips the value of which is equal to an amount to be paid out to a player for a winning wager are placed onto and then removed from the dealer antenna the status of each of those chips should be changed to non-inventory since they are presumed to be now paid out to the appropriate player as a result of the winning wager.

The processor 784 is also operable to communicate with one or more display devices: (i) a dealer display 758 (e.g., one or more displays such as display 340 and/or display 322 of FIG. 3) and a second display 770. The second display 770 may comprise, for example, a display for displaying historical outcomes or other game information to a player (e.g., a trend board, such as described with respect to display 350 of FIG. 3). The dealer display 758 may output information such as (i) prompts for how much should be collected from players in commission or losing wagers (e.g., for each player position involved in the hand); (ii) prompts for how much should be paid out to players for winning wagers (e.g., for each player position involved in the hand); (iii) prompts asking the dealer to confirm that a Change Transaction is in progress and/or a message to the dealer that the value of the inventory chips comprising the Change Transaction is not yet equal to the value of the non-inventory chips of that Change Transaction (if that is, in fact, the current state of the values determined by the CGS); (iv) tray variance or out-of-balance alerts, informing the dealer of missing chips from the RFID-enabled chip tray; and/or (v) other information regarding a status of the game, including information regarding a status of one or more wagers or RFID-enabled chips being used on the table. In some embodiments, one or both of the displays 758 and 770 may include or have associated therewith its own processor, memory and program (and may be operable to communicated data to and/or from the processor 484). Either of the display devices 758 and 770 may comprise, for example, one or more display screens or areas for outputting information related to game play on the gaming system, such as a cathode ray tube (CRT) monitor, liquid crystal display (LCD) screen, or light emitting diode (LED) screen. In some embodiments, either of the display devices 758 and 770 may comprise a touch screen.

As described herein, in some embodiments an RFID-enabled chip tray may comprise one or more antennas for reading information from RFID-enabled chips placed in the chip tray. In such embodiments, the processor 784 is further operable to communicate with the one or more chip tray antenna(s) 760A. The one or more antenna(s) 760A may be operable to read data from one or more chips placed within a chip tray (e.g., chip identifier, chip set identifier, chip denomination, etc.). In accordance with some embodiments, the CGS is programmed to recognize a chip that is detected as having been placed on a wager placement position as a payout chip if that chip was recognized by the CGS as being in the chip tray (e.g., based on data received from the chip tray antenna(s) 760A immediately prior to being detected on the wager placement position.

The processor 784 is further operable to communicate with a shared position antenna 760C, which comprises at least one antenna on a shared or common betting area for recognizing chips placed (and removed from) the shared or common betting area.

The processor 784 is further operable to communicate with a plurality of detecting components (e.g., RFID antennas or optical imaging components) at physical player stations (also referred to as physical player positions) of the physical table. As described with respect to FIGS. 2 and 3, in some embodiments each physical player position of a physical table may have a corresponding Player bet spot area and a Banker bet spot area and each such area may have associated therewith its own antenna or other detecting component for determining that a wagering chip or other gaming element has been placed within this area and thus that a wager has been placed on either the Player win outcome or the Banker win outcome. The table system 700 illustrates three player positions 756 (756*a*, 756*b* and 756*c*) as each having two detecting components associated therewith: a Player Bet detector 796 and a Banker Bet detector 798. Thus, player station 756*a* has associated therewith Player Bet detector 796A and Banker Bet detector 798A, player station 756B has associated therewith Player Bet detector 796A and Banker Bet detector 798B and player station 756C has associated therewith Player Bet detector 796C and Banker Bet detector 798C. Each detecting component may be uniquely identifiable by, for example, (i) a unique identifier associated therewith, and (ii) an identification of a port or other component of the table associated with the antenna (e.g., the port into which the antenna is plugged into may have a unique identifier associated therewith) and such unique identifier may be transmitted to or recognized by the processor 784 when chip information regarding a chip acquired by a respective detecting component is transmitted to the processor 784, such that the processor 784 may be programmed to determine which player position and which wager placement position within the player position the wagering chip has been placed on. In some embodiments, the chip status database 790B may store detailed data with information regarding chips identified at a table, such details being associated with a chip identifier of each chip for which data is stored (e.g., chip value, chip denomination, chip set identifier, bankroll identifier or other indicator of a category or characteristic associated with a chip, time of acquisition, which stack or wager the chip is associated with, etc.). Storing such data at the table may allow for faster RFID scanning or other detecting, since the system will not need to obtain a lot of data every time a chip is acquired or recognized by an antenna or other detecting component of a table (e.g., only the chip identifier may be necessary and additional information, such as whether the chip is an inventory chip or a non-inventory chip, may be looked up by the system based on the chip identifier from a local database or memory).

In some embodiments, the CGS 750 is further operable to communicate with an electronic shoe 764. The shoe 764 may be an intelligent shoe such as the IS-T1™ and IS-B1™ or the MD1, MD2 sold by SHUFFLE MASTER or other such devices. The shoe 764 may be able to determine which cards are being dealt to which player station, through RFID technology, image recognition, a printed code on the card (such as a barcode), or the like. The embodiments described herein are not dependent on any particular technique used to recognize cards dealt in a card game (or cards remaining as available to be dealt). Further information about intelligent shoes may be found in U.S. Pat. Nos. 5,941,769 and 7,029,009, both of which are incorporated by reference in their entireties and U.S. Patent Application Publications 2005/0026681; 2001/7862227; 2005/0051955; 2005/0113166; 2005/0219200; 2004/0207156; and 2005/0062226 all of which are incorporated by reference in their entireties. In place of an intelligent shoe, cameras, such as may be used with pattern recognition software to detect what cards have been dealt to what player stations and what chips have been wagered at particular player stations. One method for reading data from playing cards at table games is taught by German Patent Application No. P44 39 502.7. Other methods are taught by U.S. Patent Application Publication 2007/0052167 both of which are incorporated by reference in their entirety.

The CGS 750 is further operable to communicate with a dealer station antenna 760B, which comprises one or more antennas placed in a dealer area of the corresponding table. The dealer station antenna 760B may be operable to detect RFID-enabled chips which have been placed within its acquisition area, such as chips the dealer places in the area for recognizing by the system prior to placing them into the dealer tray or paying them to a player. As described herein, the CGS may be operable to determine whether the chips detected by the dealer station antenna 760B include both inventory and non-inventory chips at any given time and, if they do, infer that a Change Transaction has been requested and initiate a Change Transaction sub-routine, such as the example one described with reference to FIG. 5B.

Figure 5A:
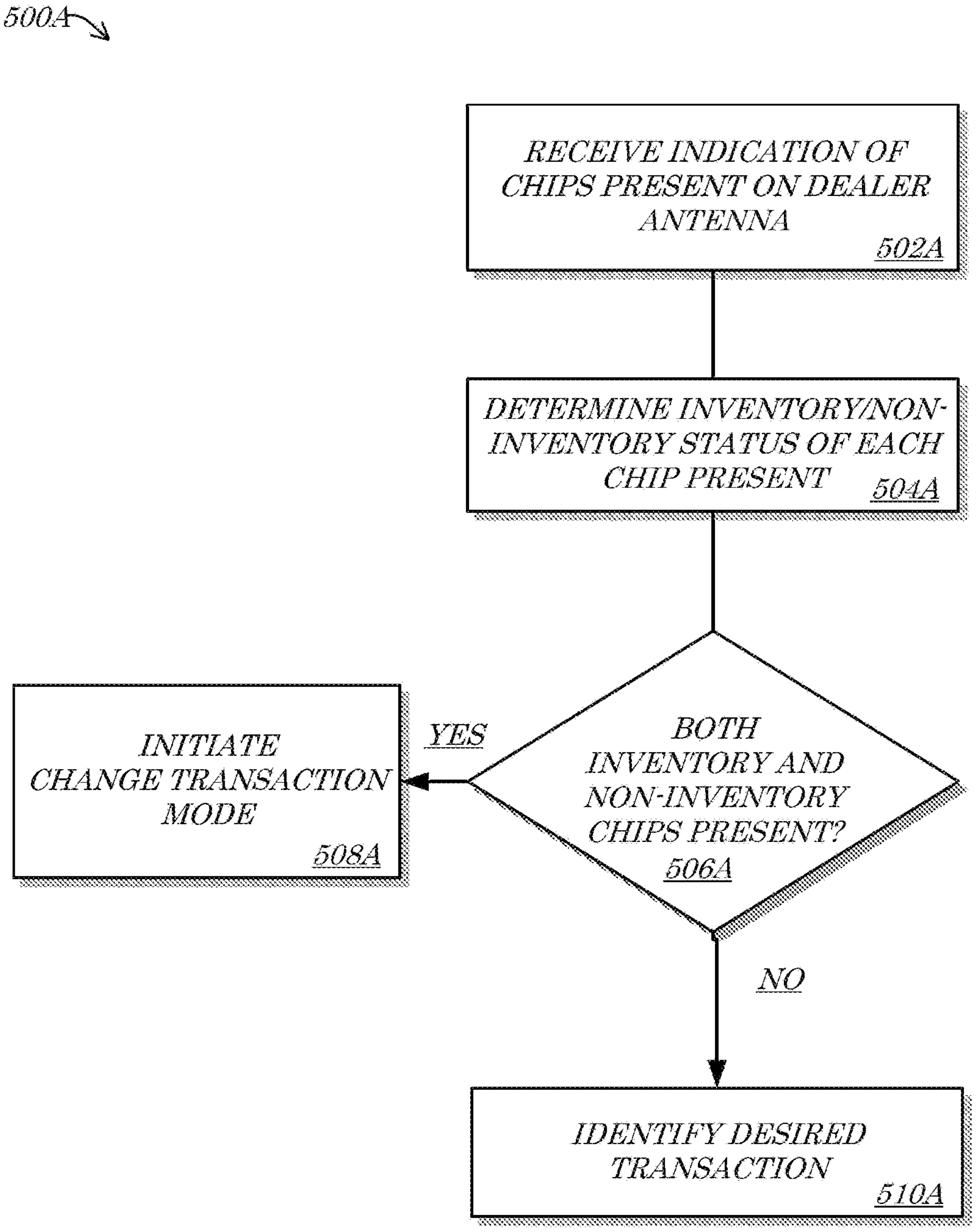
FIG. 5A illustrates a flowchart of an example process consistent with one or more embodiments described herein.
Figure 5B:
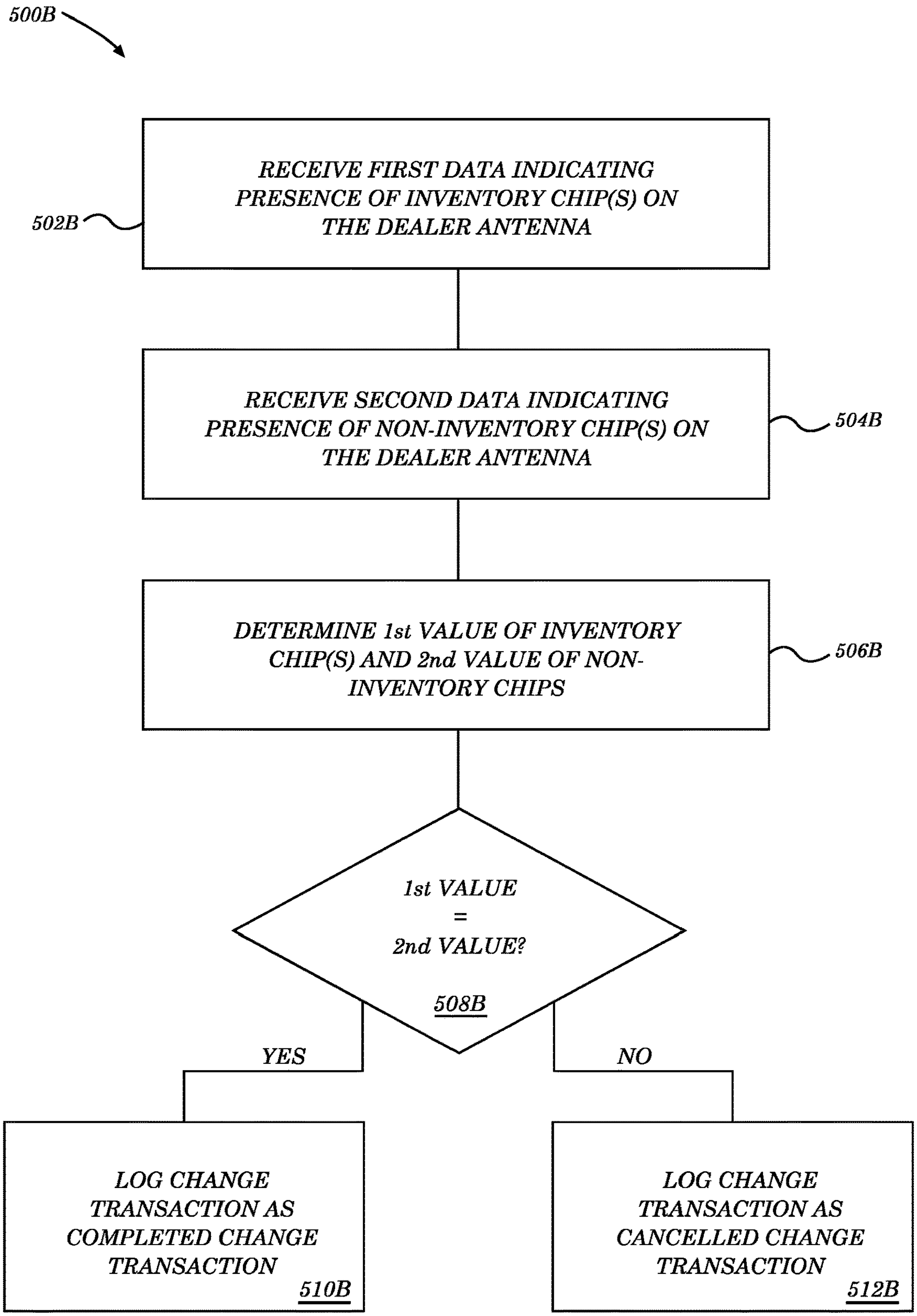
FIG. 5B illustrates a flowchart of an example process consistent with one or more embodiments described herein.

Turning now to FIGS. 5A and 5B, illustrated therein are flowcharts of respective example processes 500A (FIG. 5A) and 500B (FIG. 5B), each consistent with some embodiments described herein. Process 500A comprises a process for implementing at least some of the embodiments described herein, such as embodiments providing for inferring that a Change Transaction is occurring on the table based on the presence of both inventory and non-inventory wagering chips on the dealer antenna. Process 500B comprises a process for tracking and verifying that a Change Transaction has been completed, in accordance with some embodiments.

In one embodiment, at least a portion of process 500A (FIG. 5A) and/or process 500B (FIG. 5B) may be performed continuously or repeatedly by a game controller during a game event (e.g., during a round or deal of a card game). Process 500A and/or process 500B may be performed, for example, by at least one of a server device operable to facilitate the identification or tracking of wagering activity for a game (e.g., a card game) and/or a player device enabling a player to play the game remotely. For example, the process 500A and/or process 500B may be performed by at least one of (i) a table system 120 (FIG. 1); (ii) a table game server 110 (FIG. 1); and/or (iii) a processor 784 (FIG. 4). Additional and/or different steps may be added to those depicted. Not all steps depicted are necessary to any embodiment described herein.

Process 500A and/or process 500B may comprise a subroutine of a more general program. In one embodiment, process 500A and/or process 500B may comprise at least a part of program 790A (FIG. 4). Process 500A and process 500B is each an example process of how some embodiments described herein may be implemented and should not be taken in a limiting fashion. In one embodiment, at least some of the steps of process 500A and at least some of the steps of process 500B may be combined into a single sub-routine. A person of ordinary skill in the art, upon contemplation of the embodiments described herein, may make various modifications to process 500A and/or process 500B without departing from the spirit and scope of the embodiments in the possession of applicants.

Referring now to FIG. 5A in particular, the process 500A may be performed continuously (e.g., the dealer antenna of an RFID-enabled table may be polled periodically or continuously to determine whether any chips are present on the dealer antenna) or, in some embodiments, may be launched or initiated upon it being determined that any chips are present on the dealer antenna. The goal of process 500A is to determine whether it is appropriate for the system to enter a Change Transaction mode or to launch a Change Transaction sub-routine.

Upon it being determined that chips are present on the dealer antenna (step 502A), the inventory/non-inventory status of each such chip is determined (step 504A). It may be determined that chips are present on the dealer antenna when a signal is received from a chip when the dealer antenna is polled or when an optical recognition component recognizes the presence of a chip within a predetermined area of the table. The status of a given chip may be determined based on data received from the chips. In accordance with some embodiments, the status may be determined directly from the data read or received from a chip (e.g., the chip itself may store and transmit (or allow to be read) an indication of a current status). In other embodiments, the status may be determined indirectly based on an identifier or other information read or received from a chip. For example, in one embodiment, a CGS or other system component or program may identify or classify each wagering chip detected or read by a dealer antenna as either an "inventory" chip or a "non-inventory" chip based on the UUID of each chip as received from the dealer RFID antenna and the inventory/non-inventory status corresponding to each UUID in a database or other memory device accessible to the game controller.

Once the status of the chips present on the dealer antenna is determined, the system compares the statuses and determines whether both inventory and non-inventory chips are present at the same time (step 506A). If the answer to this query is yes, then process 500A continues to step 508A and thereby the system enters a Change Transaction mode or initiates a Change Transaction sub-routine. For example, the system may proceed to a sub-routine such as the example one illustrated in FIG. 5B. In some embodiments this may include outputting information to a dealer about the Change Transaction, such as the example information depicted in the example embodiments of FIGS. 6A-6D.

If, on the other hand, it is determined that only inventory chips or only non-inventory chips are present (e.g., the dealer has placed inventory chips on the dealer antenna spot, as part of a procedure for paying a win amount to a player), the system may identify or infer that another type of transaction is being conducted and proceed initiating a sub-routine or mode for another type of transaction as appropriate. The systems and methods described herein may enable a device (e.g., CGS or other controller) to determine or infer a type of transaction that is being conducted at a table system based on a combination of the statuses of the chips present on the dealer antenna, a status or stage of a game and/or an input from a dealer.

In one example of another type of transaction that may be inferred by the system based on the respective status of each chip detected on the dealer antenna and a stage of the game or state of the table system or game, in some embodiments a Payout Verification transaction may be inferred and a Payout Verification mode may be initiated if it is determined that only inventory chips are present and the status of the game is such that the outcome of a game has been determined and the dealer is supposed to be paying out wins and collecting losses and other fees. In one embodiment, a Payout Verification transaction may comprise verifying that the value of the inventory chips placed on the dealer antenna matches the value of chips the dealer is supposed to pay out to a player.

In another example of a type of transaction that may be inferred by the system based on the respective status of each chip detected on the dealer antenna and a stage of the game or state of the table system or game, a Quick Buy-In transaction may be inferred if only inventory chips (i.e., not both inventory and non-inventory chips) are detected on the dealer antenna before a particular stage of a game or during a particular state of the table (e.g., before a first card is drawn for a game from a card shoe associated with the table system). The system may infer that a player is requesting to buy in to the game before it begins and may initiate a Quick Buy-In mode that includes outputting certain options or information to a dealer via a dealer screen. For example, the system may output the value of the chips that it has detected on the dealer antenna and ask the dealer to verify this value. Further, the system may output an interface that allows the dealer to select a player and/or player position to be associated with the inventory chips. A Quick Buy-In mode or sub-routine may provide for associating the particular player and/or player position with the chips currently on the dealer antenna and changing the status of each such chip from inventory to non-inventory (since the chips will now belong to a player and not be part of the dealer's chip tray inventory).

In some embodiments, the system may be operable to utilize one or more factors in addition to the inventory/non-inventory status of the chips detected on a dealer antenna and the current stage of the game or state of the table when inferring a type of transaction being conducted before concluding that the type of transaction is in fact being conducted and initiating or launching a particular mode or sub-routine. For example, in determining whether to initiate a Quick Buy-In mode or sub-routine, the system may be operable to first determine whether another type of transaction is already currently in progress (e.g., a Fill, Credit, Buy In or Change Transaction) and not initiate the Quick Buy-In mode or sub-routine if one of these other types of transactions is already in progress. In other words, if certain conditions are met (e.g., only inventory chips are detected at the dealer antenna and the state of the table or game indicates that the first card for the next or current game has not yet been drawn from the shoe of the table), the system may determine that it is possible that a first type of transaction (e.g., a Quick Buy-In transaction) is being conducted but then make other determinations (such as whether a second or third, etc. type of transactions has previously been identified and is currently in progress) before concluding that the first type of transaction (e.g., a Quick Buy-In transaction) is being conducted and launching the corresponding mode or sub-routine.

Accordingly, returning again to process 500A, in some embodiments the process 500A may include one or more additional steps (e.g., in between step 506A and 508A) defining one or more factors for the system to consider prior to concluding that a Change Transaction mode or sub-routine should be initiated. For example, even if it is determined, in step 506A, that both inventory and non-inventory chips are present at the same time on the dealer antenna, prior to launching the a Change Transaction mode or sub-routine, the system may first verify that (i) the current stage of a game or state of the table is appropriate for inferring a Change Transaction (e.g., a state of game is during or after the game play (which may include a time during which overpay and underpay errors are being cleared)); and/or (ii) another type of transaction (e.g., a Fill, Credit, Buy-In, Quick Buy-In) is not already in progress. If, during any of these additional steps, the system determines that a Change Transaction is not being conducted, process 500A may flow from step 506A to 510A even if both inventory and non-inventory chips are present at the same time on the dealer antenna.

Referring now to FIG. 5B, illustrated therein is a flowchart of an example process 500B consistent with some embodiments described herein. Process 500B comprises a process for processing the Change Transaction that is inferred from the presence of both inventory and non-inventory chips on a dealer antenna (such as may be the result of process 500A (FIG. 5A) or once a dealer confirms that a Change Transaction is being initiated). For example, the game controller may launch, initiate or enter into process 500B upon inferring via process 500A (FIG. 5A) that a Change Transaction is being conducted, as based on the recognition that both inventory and non-inventory chips are present on the dealer antenna and that other pre-requisite conditions, if any, have been satisfied (e.g., no other types of transactions are currently being conducted).

Process 500B may be performed, for example, upon it being determined (e.g., by the game controller) that both of the following are present on, or have been detected as being within range of, a dealer antenna: (i) at least one wagering chip corresponding to a status of "inventory"; and (ii) at least one wagering chip corresponding to a status of "non-inventory." In step 502A first data is received or determined, the first data indicating the presence of inventory chips on the dealer antenna. For example, the game controller may have received UUIDs from the dealer antenna and determined that the status of at least some of them correspond to an inventory status. In step 504B second data is received or determined, the second data indicating the presence of non-inventory chips on the dealer antenna. For example, the game controller may have received UUIDs from the dealer antenna and determined that the status of at least some of them correspond to a non-inventory status.

In step 506B, the monetary value of each inventory chips is determined and summed to identify a $1^{st}$ value, this $1^{st}$ value being a sum monetary value of all the chips currently on the dealer antenna that correspond to a status of "inventory". The monetary value of all non-inventory chips is also determined and summed to identify a $2^{nd}$ value, this $2^{nd}$ value being a sum monetary value of all the chips currently on the dealer antenna that correspond to a status of "non-inventory." In some embodiments, additional chips may continue to be placed on the dealer antenna and the game controller may continue to determine the inventory/non-inventory status of each such additional chip and add its value to either the $1^{st}$ value or the $2^{nd}$ value, as appropriate based on its inventory/non-inventory status.

In step 508B, it is determined whether the $1^{st}$ value is equal to the $2^{nd}$ value. In one embodiment this step is performed once a completion condition for the Change Transaction is determined (e.g., all chips have been removed from the dealer antenna) while in other embodiments this step may be performed continually or semi-continually as the $1^{st}$ value and the $2^{nd}$ value is updated if additional chips are added to the dealer antenna (or a new process for added chips may be initiated after a Change Transaction is considered completed, as illustrated and described with reference to FIG. 6C herein). Various examples of completion conditions are described elsewhere herein and will not be repeated for purposes of brevity.

If it is determined in step 508B that the $1^{st}$ value is equal to the $2^{nd}$ value, the Change Transaction is considered to be (e.g., is stored or logged as) a completed Change Transaction (step 510B). If the $1^{st}$ value is equal to the $2^{nd}$ value, it may be assumed (in accordance with some embodiments) that there was no seeming error detected in the Change Transaction and the value of inventory chips paid out by the dealer was equal to the value of non-inventory chips taken in by the dealer.

In some embodiments, additional actions or steps may be taken with respect to process 500B. For example, it should be understood that a status of chips involved in the Change Transaction may be changed from inventory to non-inventory and vice versa. In other words, the chips being paid out by the dealer to the player ("the Chips Out") will have a status of "non-inventory" associated with them upon completion of the Change Transaction (these chips having had an "inventory" status associated with them prior to the Change Transaction) while the chips that were non-inventory chips prior to the Change Transaction and that are being provided by the player as an exchange for other denomination chips will have a status of "inventory" associated with them upon completion of the Change Transaction.

Returning to step 508B, if it is determined in step 508B that the $1^{st}$ value is not equal to the $2^{nd}$ value (suggesting that there is a seeming error detected in the Change Transaction and the value of inventory chips paid out by the dealer is not equal to the value of non-inventory chips taken in by the dealer), the Change Transaction is stored or logged as a cancelled or incomplete Change Transaction (step 512B).

In accordance with some embodiments, additional actions may be performed by the game controller if the Change Transaction is determined to be a cancelled or incomplete Change Transaction. For example, (i) a message or alert may be output to the dealer (e.g., via a dealer display), another casino employee (e.g., a text message may be sent to the dealer's supervisor); (ii) a component of the table may be adjusted to alert the dealer to the potential problem (e.g., a light or sound alarm may be activated); (iii) a video of the Change Transaction that had been taken with an overhead camera may be retained, stored or forwarded to a casino employee; (iv) a functionality of the table may be disabled (e.g., the dealer may not be able to initiate a new game because the dealer display may be frozen or paused or a card shoe may be disabled); and/or (v) an indication of the transaction may be specially flagged or tagged, to allow for being subsequently readily recognized or findable as a cancelled or incomplete transaction (e.g., for reporting purposes or to help identify a source of a discrepancy in the dealer's chip tray inventory).

The game controller may thus not consider a Change Transaction to be completed until a certain completion condition is satisfied, to allow for adjustment to the values of the inventor and non-inventory wagering chips that are part of the Change Transaction. In one embodiment, the game controller may not log or store the Change Transaction as completed, or perform other actions as may be appropriate or necessary based on a result of the Change Transaction, until such completion condition is satisfied.

One example of a completion condition for a Change Transaction to be considered as completed by the system is a removal of all wagering chips that are part of the Change Transaction (the inventory and non-inventory chips) from the dealer antenna (or the dealer position of the table that is within range of the dealer antenna, such that the wagering chips are no longer detectable by the dealer antenna). In accordance with one embodiment, once such a completion condition is determined to have been satisfied, the system may process (e.g., store in a log of transactions that have been processed by the system) one of two types of Change Transactions: (1) determine that the total monetary value of inventory wagering chips is equal to the total monetary value of non-inventory wagering chips upon the completion condition being satisfied, and thus process or store the Change Transaction as a "completed Change Transaction"; or (2) determine that the total monetary value of inventory wagering chips is not equal to the total monetary value of non-inventory wagering chips upon the completion condition being satisfied, and thus process or store the Change Transaction as a "cancelled Change Transaction" or an "incomplete Change Transaction".

In accordance with some embodiments, the game controller may cause certain actions, events or sub-routines to be undertaken if a Change Transaction is determined to be a cancelled or incomplete Change Transaction upon the completion condition be satisfied. For example, the game controller may cause a message, warning or alert to be output to the dealer or other casino personnel (e.g., via the dealer display or other device or display, such as a text alert that may be output via a mobile device of a supervisor of the dealer). In some embodiments, the game controller (in addition to or in lieu of outputting a message or prompt to the dealer) may disable or pause one or more functions of the table (e.g., may not allow the dealer to resume dealing cards by disabling an electronic shoe) if the Change Transaction is determined to be a cancelled or incomplete Change Transaction or may cause a light or other visual warning signal to be output to the dealer via a component of the table system. In yet another example, the game controller may cause a video recording of the dealer's actions during the Change Transaction (e.g., such as one taken via an overhead camera that "splashes" the transaction activity with video footage) to be retained (or even forwarded to other casino personnel for verification) if the Change Transaction is determined to be a cancelled or incomplete Change Transaction. In other embodiments, the transaction may simply be logged as a cancelled or incomplete Change Transaction in a log or memory and the game play may not otherwise be disrupted at the table. In some embodiments, the log of the cancelled or incomplete Change Transaction may be useful going forward for identifying a source of any discrepancies in the dealer's chip tray at the end of the dealer's shift.

In some embodiments, the game controller may cause or prevent certain actions while a Change Transaction is being conducted (e.g., prior to a Change Transaction being logged as either complete or cancelled). For example, the game controller may be operable to perform one or more of the following actions while a Change Transaction is being conducted: (i) display a Change Transaction indicator on a dealer screen until the Change Transaction is determined to be finalized (e.g., a "Change Transaction" banner may appear on a dealer screen); (ii) prevent other types of transactions from being processed by the system for the table until the Change Transaction is determined to be finalized; (iii) prevent messages not related to the Change Transaction from being output to the dealer; (iv) disable at least one dealer menu, such that the dealer cannot initiate processes at the table not related to the Change Transaction; and (v) disable or pause a scan of inventory in a dealer tray from being conducted until the Change Transaction is finalized.

Figure 6A:
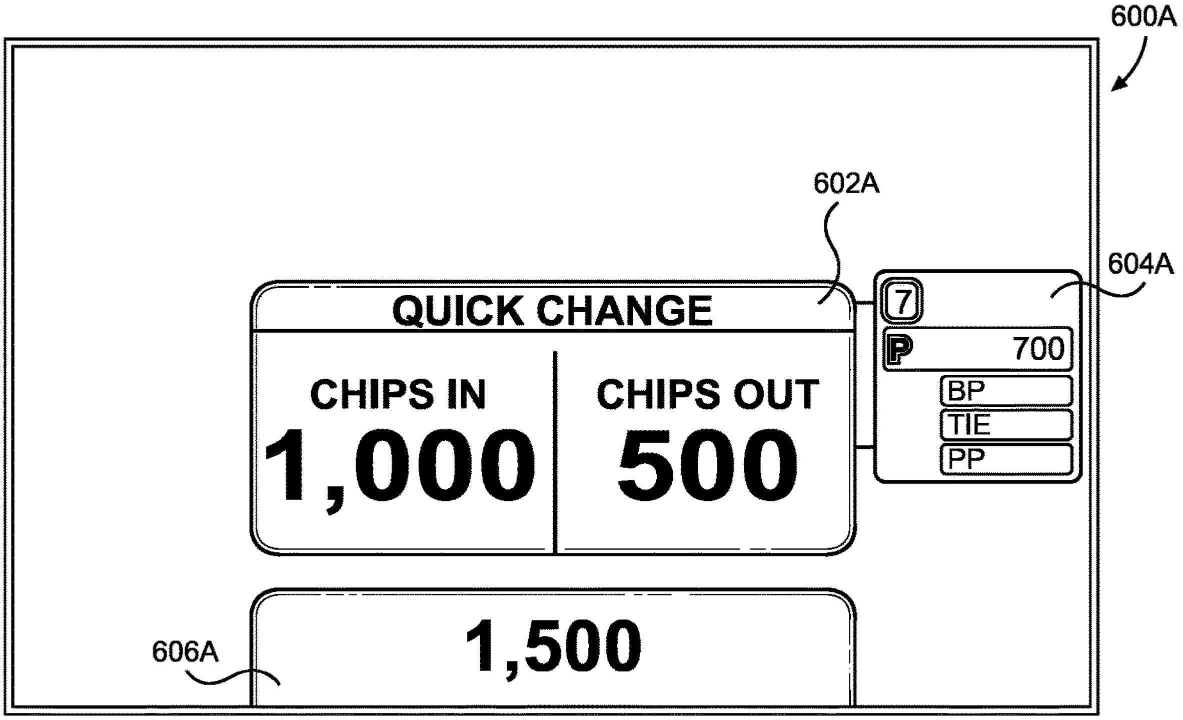
FIG. 6A illustrates a graphical user interface illustrating information that may be output to a dealer of a game under certain circumstances, in accordance with some embodiments described herein.
Figure 6B:
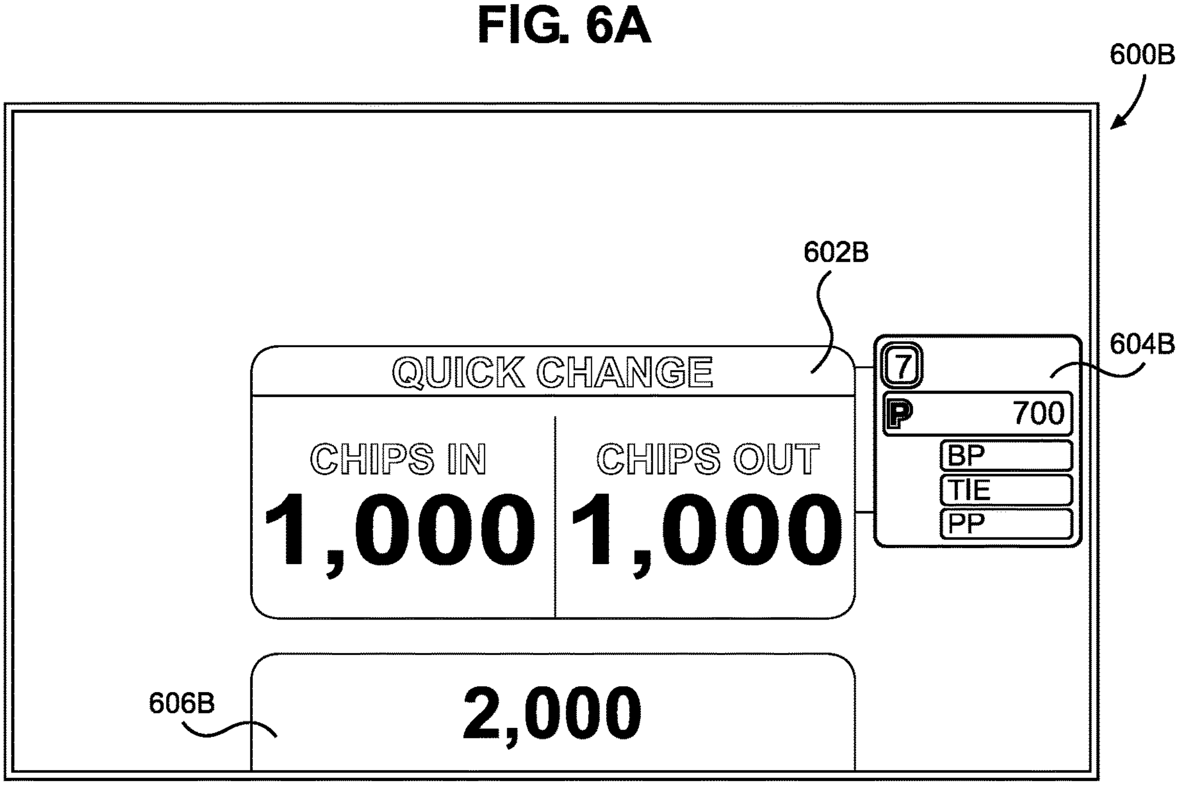
FIG. 6B illustrates a graphical user interface illustrating information that may be output to a dealer of a game under certain circumstances, in accordance with some embodiments described herein.

Referring now to FIGS. 6A-6B, illustrated therein are example GUIs that may be output to a dealer during a Change Transaction mode of a table. In one example embodiment, the game controller may prompt a dealer via a dealer display or screen as to whether an inference or determination that a Change Transaction is being conducted is correct. In other embodiments, no affirmative confirmation or verification from a dealer is sought, the game controller proceeds Zautomatically to process a Change Transaction upon detecting any combination of both inventory and non-inventory wagering chips on the dealer antenna or other detecting component at a given time (e.g., presuming other pre-requisite conditions, if any and as described herein, for inferring a Change Transaction are satisfied). In such embodiments, examples of which are illustrated in the GUIs of FIGS. 6A-6D, information regarding an inferred Change Transaction may be output to a dealer via a dealer screen even if a dealer is not requested to confirm that a Change Transaction is being conducted prior to entering a Change Transaction mode or sub-routine (or a dealer may have the ability to provide input to the system to indicate that the inferred Change Transaction is not in fact being conducted after seeing such a screen to indicate that the system is inferring a Change Transaction).

Referring to FIG. 6A in particular, illustrated therein is an example GUI 600A, which illustrates one example of information that may be output to a dealer upon a Change Transaction mode being initiated (e.g., when both inventory and non-inventory chips are recognized as being present on a dealer antenna at the same time) and while the Change Transaction is not yet complete. The GUI 600A indicates, in area 602A, the total value of non-inventory chips present on the dealer antenna and the total value of inventory chips simultaneously present on the dealer antenna. The total value of the non-inventory chips is shown under the heading "Chips In", meaning that these are non-inventory chips being provided by the player in exchange for chips of a different denomination(s) The total value of inventory chips of the different denomination(s) that are being provided by the dealer from the dealer tray is shown under the heading "Chips Out." In the example of GUI 600A, area 602A indicates that the total value of Chips In (i.e., non-inventory chips) is 1,000 while the total value of Chips Out (i.e., inventory chips) is 500. In other words, the value of non-inventory chips does not equal the value of inventory chips. This may indicate that the Change Transaction is not yet complete (e.g., the dealer is about to add more inventory chips to the dealer antenna and thus the total value of Chips Out is expected to change). In some embodiments, although not shown in FIG. 6A due to the black-and-white nature of the drawing, a Change Transaction that is in progress but not yet complete because the total value of Chips In does not equal the total value of Chips Out, may be visually indicated to a dealer in a manner other emphasized the incomplete status of the Change Transaction, such as by including a certain color (e.g., yellow or orange) in the interface. For example, the banner or background behind the respective values of Chips In and Chips Out may be output in a certain color (e.g., yellow or orange), to readily indicate to the dealer that the values do not yet match. The example GUI 600A also indicates additional information, in accordance with some embodiments. For example, the GUI 600A indicates in area 604A the player position corresponding to the Change Transaction or the Chips In (e.g., the player position associated with the non-inventory chips present on the dealer antenna), as well as the sum value of all chips (both inventory and non-inventory chips) present on the dealer antenna (in area 606A).

It should be noted that, in some embodiments, additional information may be output to a dealer via a screen such as illustrated in GUI 600A or GUI 600B. For example, in addition to the value of the chip(s) detected on a dealer antenna (in one or more of areas 602A/602B and 606A/606B), the number of chips may also be indicated (e.g., in area 602A, if it is six (6) chips that are on the dealer antenna in the situation depicted in GUI 600A, the number six (6) may be output in area 606A).

Turning now to FIG. 6B, illustrated therein is an example GUI 600B that may be output to a dealer during a Change Transaction. The GUI 600B may comprise the GUI 600A after the content has been updated based on adjustments to the chips on the dealer antenna. In particular, area 602B of the GUI 600B (which corresponds to area 602A of GUI600A) shows that additional inventory chips have been added by the dealer to the dealer antenna and that the value of the Chips Out is now 1,000 (rather than 500, as it was in GUI 600A). The total value of both the inventory or non-inventory chips on the dealer antenna has likewise been updated in area 606B (which corresponds to area 606A of GUI 600A), to indicate that it is now 2,000. The area 604B indicates that the Player Position corresponding to the Change Transaction indicated in GUI 600B is still Player Position 7, as it was in GUI 600A. In some embodiments, an additional easily recognizable visual indicator may be employed to readily convey to the dealer that the Change Transaction is now considered to be complete, because the value of the Chips In equals the value of the Chips Out. For example, the banner or background color behind the Chips In and Chips Out values may be a certain color (e.g., green). In the examples of FIGS. 6A and 6B, the text font of the words "Chips In" and "Chips Out" is rendered differently to indicate different status or stages of the Change Transaction being depicted (the font in GUI 600A is represented in black color while the font in GUI 600B is represented in white color).

Figure 6C:
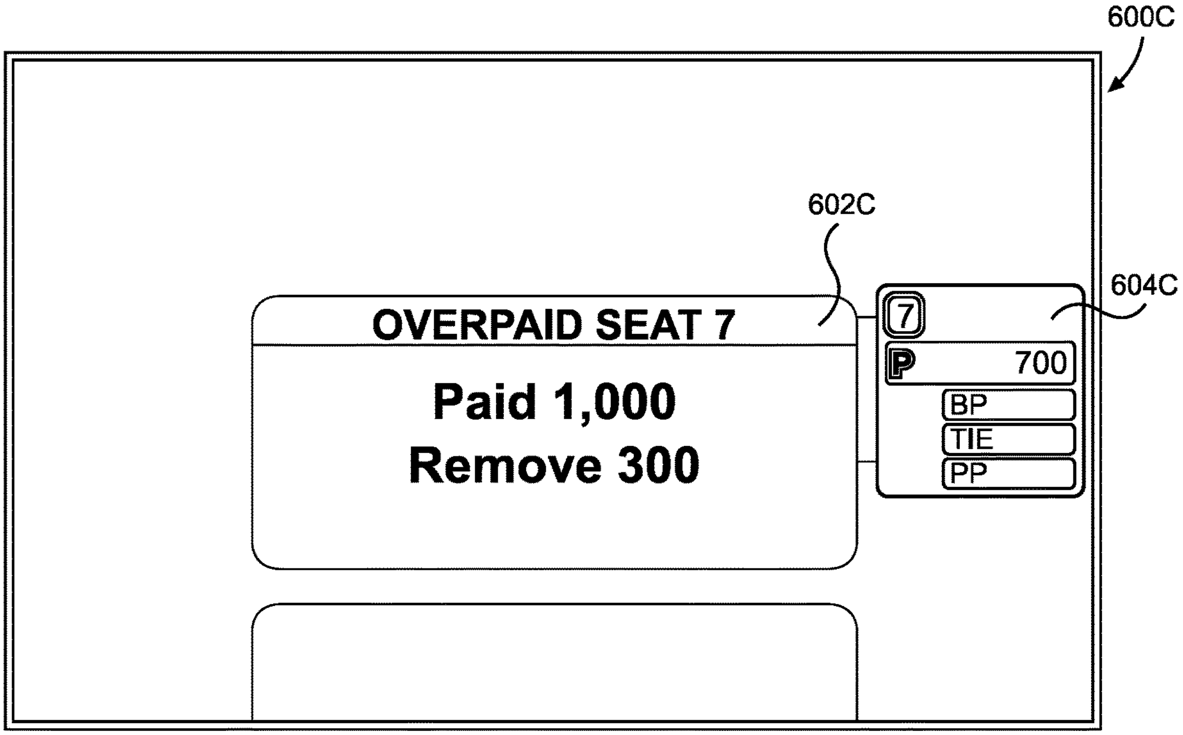
FIG. 6C illustrates a graphical user interface illustrating information that may be output to a dealer of a game under certain circumstances, in accordance with some embodiments described herein.

Turning now to FIG. 6C, illustrated therein is an example GUI 600C that may be output to a dealer in a circumstance where an error has been detected by the system, the specific error being illustrated comprising an overpayment by the dealer of inventory chips. In accordance with some embodiments, when a dealer is paying inventory chips to a player, the dealer will first place those chips on the dealer antenna such that the system may recognize the value of the chips being paid by the dealer to the player. In some circumstances, the dealer may inadvertently overpay a player (e.g., by taking too many chips out of the dealer tray or miscounting the chips or mistaking the denominations of the chips). As described herein, the present system is operable to track game play, including wagers made and an outcome of a hand, and thus be able to calculate the amount of win to be paid out to each player and the amount of wagers to be collected by the dealer. Thus, the system may alert the dealer via a screen such as that depicted in GUI 600C if the system determines that the dealer is overpaying a player at a certain position. Area 602C of GUI 600C indicates the amount being paid by the dealer and the portion of this amount that is considered by the system to be an overpayment and thus how much of the value the dealer should remove from the dealer antenna prior to providing the chips to the player. Area 604C indicates the player position corresponding to the overpayment.

Figure 6D:
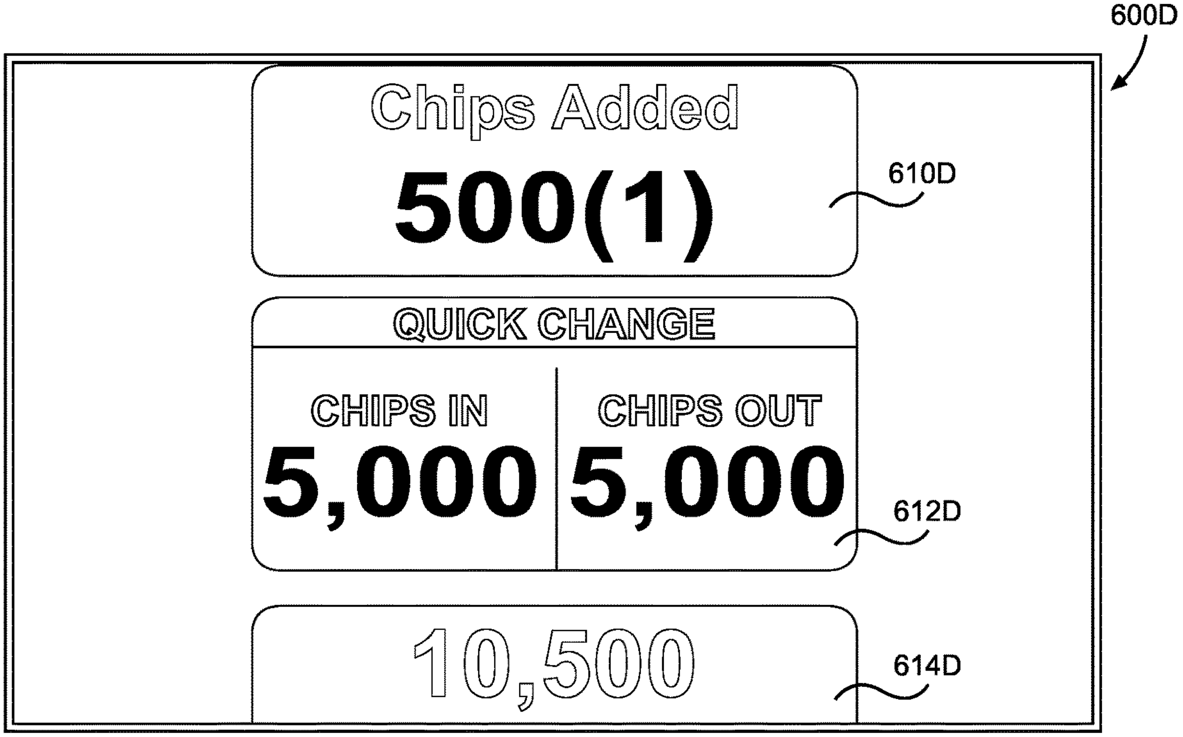
FIG. 6D illustrates a graphical user interface illustrating information that may be output to a dealer of a game under certain circumstances, in accordance with some embodiments described herein.

Turning now to FIG. 6D, illustrated therein is an example GUI 600D that may be output to a dealer in a circumstance in which additional chips are added to the dealer antenna after a Change Transaction is considered completed (e.g., after the Change Transaction is logged, in step 510B, as a completed Change Transaction). In accordance with some embodiments, a dealer can adjust a Change Transaction by removing or adding wagering chips to/from the dealer antenna, either before or after a Change Transaction is considered a completed change transaction or a completion condition is satisfied. For example, a dealer can add additional non-inventory wagering chips that the player hands to the dealer when requesting a change or color-up transaction. In another example, the dealer can add additional inventory wagering chips that he/she believes are necessary to make an equal exchange of value for the non-inventory chips for which a player is requesting a change or color-up transaction. The detecting component (e.g., RFID antenna) will continue to communicate with the game controller to provide an indication of such additional chips detected (e.g., will transmit the UUID of additional chips added to the dealer position or other relevant area corresponding to the detecting component, such that the game controller can determine the respective status of each such additional chip). The game controller may then, in turn, update a GUI output to the dealer such that the values displayed reflect the additional chips added and the dealer is made aware that the detecting component of the table has detected added chips.

In the example GUI 600D of FIG. 6D, area 610D indicates that one or more chips having a value of 500 have been added to the dealer antenna and the number of such chips corresponding to the value (in this case, the number being one (1)). Area 612D indicates the prior value of Chips In and Chips Out for a Change Transaction that was considered to be complete because these two values were equal. Area 614D indicates the total current value of all chips (inventory and non-inventory) currently detected on the dealer antenna. In accordance with some embodiments, a dealer may thus be made aware that the system has recognized additional chips to have been added to chips comprising a completed Change Transaction. The "Chips Added" or similar message as depicted in GUI 600D may be removed if the additional chips are removed from the dealer antenna or if corresponding additional chips of a different status are also added, to make the value of the inventory and non-inventory chips equal again. In the latter case, the values of the inventory chips and non-inventory chips may be adjusted for the completed Change Transaction in a transaction log of the system and the Change Transaction may once again by considered a completed Change Transaction.

Although various embodiments have been described herein, modifications or additional embodiments would be understood by one of ordinary skill in the art upon reading the present disclosure.

Rules of Interpretation & General Definitions

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s)

may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, LDP, rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as standard definition (SDTV), enhanced definition (EDTV), high definition (HD), or the like. The information may likewise be static, in which case, painted glass may be used to form the display. Note that static information may be presented on a display capable of displaying dynamic information if desired.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, Local Area Network (LAN), Wide Area Network (WAN), or Ethernet (or IEEE 802.3), Token Ring, or via any appropriate communications means or combination of communications means. Exemplary protocols include but are not limited to: BLUETOOTH™, TDMA, CDMA, GSM, EDGE, GPRS, WCDMA, AMPS, D-AMPS, IEEE 802.11 (WI-FI), IEEE 802.3, SAP, SAS™ by IGT, SUPERSAS™, OASIS™ by Aristocrat Technologies, SDS by Bally Gaming and Systems, ATP, TCP/IP, gaming device standard (GDS) published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cellular networks, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The present disclosure provides, to one of ordinary skill in the art, an enabling description of several embodiments and/or inventions. Some of these embodiments and/or inventions may not be claimed in the present disclosure, but may nevertheless be claimed in one or more continuing applications that claim the benefit of priority of the present disclosure.

What is claimed is:

1. A non-transitory computer readable medium storing instructions executable by a game controller of a physical table system, wherein the physical table system comprises:

(i) at least one physical table including an area of the table on which a dealer of the table places gaming elements corresponding to a transaction being conducted on the table, upon beginning to process the transaction; and (ii) for each of the at least one physical table, a detecting component corresponding to the area, operable to detect a gaming element being placed on the area and read data from the gaming element;

and wherein the instructions comprise instructions for the game controller to:

identify a first at least one gaming element detected by the detecting component as corresponding to an inventory status, thereby identifying at least one inventory gaming element as being present within the area;

identify a second at least one gaming element detected by the detecting component as corresponding to a non-inventory status, thereby identifying at least one non-inventory gaming element as being present within the area, wherein both the at least one inventory gaming element and the at least one non-inventory gaming element are detected as being within the area at a same time;

infer, based on a presence of both inventory and non-inventory gaming elements within the area at the same time, that a Change Transaction is being conducted by a dealer of the table; and initiate a Change Transaction mode for the table.

2. The non-transitory computer readable medium of claim 1 storing further instructions for the game controller to:

identify the first at least one gaming element as corresponding to the inventory status by looking up the inventory status based on a unique identifier (UUID) the first at least one gaming element, the detecting component reading the UUID from the first at least one gaming element.

3. The non-transitory computer readable medium of claim 1 storing further instructions for the game controller to:

identify the first at least one gaming element as corresponding to the inventory status by reading the inventory status from the first at least one gaming element.

4. The non-transitory computer readable medium of claim 1, wherein the detecting component is an RFID antenna and each of the first at least one gaming element and each of the second at least one gaming element comprise an RFID chip.

5. The non-transitory computer readable medium of claim 1, wherein the detecting component is an NFC antenna and each of the first at least one gaming element and each of the second at least one gaming element comprise an NFC tag.

6. The non-transitory computer readable medium of claim 1, wherein the detecting component is an optical reader and each of the first at least one gaming element and each of the second at least one gaming element comprise an optically readable code.

7. The non-transitory computer readable medium of claim 1 storing further instructions for the game controller to output to the dealer, via a dealer display corresponding to the at least one physical table, an indication that a Change Transaction has been inferred.

8. The non-transitory computer readable medium of claim 1 storing further instructions for the game controller to:

determine a sum of values of the at least one inventory gaming element, thereby determining an inventory gaming element value; and determine a sum of values of the at least one non-inventory gaming element, thereby determining a non-inventory gaming element value.

9. The non-transitory computer readable medium of claim 8 storing further instructions for the game controller to output, via a dealer display corresponding to the at least one physical table, an indication of both the inventory gaming element value and the non-inventory gaming element value.

10. The non-transitory computer readable medium of claim 9 storing further instructions for the game controller to:

determine that additional game elements have been detected by the detecting component prior to a finalization of the Change Transaction;

determine whether the additional game elements correspond to an inventory status or a non-inventory status;

update at least one of the inventory gaming element value and the non-inventory gaming element value based on the additional game elements and corresponding statuses; and modify the indication of both the inventory gaming element value and the non-inventory gaming element value based on the update.

11. The non-transitory computer readable medium of claim 8 storing further instructions for the game controller to:

conclude that the Change Transaction is a completed Change Transaction upon determining that the inventory gaming element value is equal to a non-inventory gaming element value.

12. The non-transitory computer readable medium of claim 8 storing further instructions for the game controller to:

determine that additional gaming elements have been detected by the detecting component after the Change Transaction is concluded to be a completed Change Transaction; and output to the dealer, via a dealer display corresponding to the at least one physical table, an indication of the additional gaming elements.

13. The non-transitory computer readable medium of claim 8 storing further instructions for the game controller to:

identify that a completion condition for the Change Transaction has been satisfied; and store in a memory that the Change Transaction is a completed Change Transaction only if the inventory gaming element value is equal to a non-inventory gaming element value upon the completion condition being satisfied;

otherwise store the Change Transaction as an incomplete Change Transaction.

14. The non-transitory computer readable medium of claim 1 storing further instructions for the game controller to initiate a Change Transaction mode at the at least one physical table upon concluding that the Change Transaction is being conducted based on a presence of both inventory and non-inventory gaming elements within the area at the same time and without requiring an indication from the dealer that the Change Transaction is being conducted prior to initiating the Change Transaction mode.

15. The non-transitory computer readable medium of claim 1 storing further instructions for the game controller to verify that another type of transaction is not in progress prior to concluding that a Change Transaction is being conducted.

16. The non-transitory computer readable medium of claim 15 storing further instructions for the game controller to determine a status of the at least one physical table, and wherein concluding that a Change Transaction is being conducted comprises concluding that a Change Transaction is being conducted based on (i) the presence of both inventory and non-inventory gaming elements within the area at the same time; (ii) a verification that another type of transaction is not in progress; and (iii) a status of the at least one physical table being a predetermined status.

17. The non-transitory computer readable medium of claim 1 storing further instructions for the game controller to, upon concluding that the Change Transaction is being conducted, implement at least one of the following protocols until the Change Transaction is determined to be finalized: (i) display a Change Transaction indicator on a dealer screen; (ii) prevent other types of transactions from being processed for the at least one physical table; (iii) prevent messages not related to the Change Transaction from being output to the dealer; (iv) disable at least one dealer menu, such that the dealer cannot initiate processes at the table not related to the Change Transaction; and (v) disabling a scan of inventory in a dealer tray from being conducted.

* * * * *